(12) United States Patent
Olgun et al.

(10) Patent No.: US 12,153,729 B2
(45) Date of Patent: Nov. 26, 2024

(54) HEAD PROPERTY DETECTION IN DISPLAY-ENABLED WEARABLE DEVICES

(71) Applicant: Snap Inc., Santa Monica, CA (US)

(72) Inventors: Ugur Olgun, Marina Del Rey, CA (US); Choonshin You, Irvine, CA (US); Bo Ya Zhang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 123 days.

(21) Appl. No.: 17/968,289

(22) Filed: Oct. 18, 2022

(65) Prior Publication Data

US 2024/0126364 A1 Apr. 18, 2024

(51) Int. Cl.
*G06F 3/01* (2006.01)
*G02B 27/01* (2006.01)
*G09G 3/00* (2006.01)

(52) U.S. Cl.
CPC ............ *G06F 3/012* (2013.01); *G02B 27/01* (2013.01); *G02B 27/017* (2013.01); *G09G 3/003* (2013.01); *G02B 2027/0138* (2013.01); *G02B 2027/014* (2013.01); *G02B 2027/0178* (2013.01); *G02B 2027/0187* (2013.01); *G09G 2340/0464* (2013.01); *G09G 2340/14* (2013.01); *G09G 2354/00* (2013.01); *G09G 2370/04* (2013.01)

(58) Field of Classification Search
CPC ............ G06F 3/012; G09G 3/003; G09G 2340/0464; G09G 2340/14; G09G 2354/00; G09G 2370/04; G02B 27/01; G02B 27/017; G02B 2027/014; G02B 2027/0138; G02B 2027/0178; G02B 2027/0187

USPC .................................................. 345/8
See application file for complete search history.

(56) References Cited

U.S. PATENT DOCUMENTS

| | | | | |
|---|---|---|---|---|
| 2005/0177929 A1* | 8/2005 | Greenwald | ............... | A61B 5/11 73/865.9 |
| 2015/0324692 A1* | 11/2015 | Ritchey | .................. | G06N 20/00 348/36 |
| 2016/0187974 A1* | 6/2016 | Mallinson | ............... | G06F 3/011 463/32 |
| 2018/0081201 A1* | 3/2018 | Lore | .................. | A61B 5/02438 |

(Continued)

FOREIGN PATENT DOCUMENTS

WO 2024086580 4/2024

OTHER PUBLICATIONS

"International Application Serial No. PCT US2023 077092, International Search Report mailed Jan. 16, 2024", 3 pgs.

(Continued)

*Primary Examiner* — Tom V Sheng
(74) *Attorney, Agent, or Firm* — Schwegman Lundberg & Woessner, P.A.

(57) ABSTRACT

A display-enabled eyewear device has an integrated head sensor that dynamically and continuously measures or detects various cephalic parameters of a wearer's head. The head sensor includes a loop coupler system integrated in a lens-carrying frame to sense proximate ambient RF absorption influenced by head presence, size, and/or distance. Autonomous device management dynamically adjust or cause adjustment of selected device features based on current detected values for the cephalic parameters, which can include wear status, head size, and frame-head spacing.

21 Claims, 10 Drawing Sheets

(56) References Cited

U.S. PATENT DOCUMENTS

| | | | |
|---|---|---|---|
| 2019/0167191 A1* | 6/2019 | Brewer | A61B 3/113 |
| 2019/0229395 A1* | 7/2019 | Hintermann | H01Q 9/26 |
| 2019/0369726 A1 | 12/2019 | Kang et al. | |
| 2020/0119433 A1* | 4/2020 | Ashwood | H01Q 1/273 |
| 2021/0122447 A1* | 4/2021 | Seilliere | B63C 11/26 |
| 2021/0165217 A1* | 6/2021 | Bucknor | G01S 5/0284 |
| 2022/0043270 A1* | 2/2022 | Zhang | H01Q 1/276 |
| 2022/0053274 A1* | 2/2022 | Xue | H04R 25/554 |
| 2022/0094891 A1* | 3/2022 | Ramanath | G09G 3/3413 |
| 2024/0063525 A1* | 2/2024 | Lin | H01Q 1/22 |

OTHER PUBLICATIONS

"International Application Serial No. PCT US2023 077092, Written Opinion mailed Jan. 16, 2024", 7 pgs.

* cited by examiner

HEAD PROPERTY DETECTION IN DISPLAY-ENABLED WEARABLE DEVICES

BACKGROUND

Head-worn augmented reality (AR) devices (e.g., AR-enabled eyewear) are often implemented with a near-eye display hosted by a transparent or semitransparent lens assembly through which the surrounding environment (the "real world") is visible to a wearer. Such near-eye displays are typically themselves partially transparent, so that objects rendered by the near-eye display (e.g., virtual objects such as 3D renderings, images, video, text, and so forth) appear to the wearer as overlaid on their real-world surrounds. AR displays in such devices are often stereoscopic, producing an illusion of depth and/or 3D location in the environment by displaying two slightly different images to the right and left eye of the wearer.

This is typically referred to as "augmented reality," which is to be distinguished from the experience provided by a head-worn device which completely occludes the wearer's visual field and displays a virtual environment through which a wearer may appear to move or be moved, typically referred to as "virtual reality" or VR. As used herein, the term "augmented reality" or "AR" refers to both augmented reality and virtual reality as traditionally understood, unless the context indicates otherwise.

In some examples, AR devices take the form of AR glasses, being electronics-enabled eyewear devices (commonly referred to as smart glasses) configured for regular wear in the manner of corrective spectacles or sunglasses. As is the case with conventional non-smart eyewear, a pair of AR glasses typically has a lens system provided by left and right lens assemblies through which the ambient environment is viewed during wear, with near-eye AR displays often being natively integrated in the glasses to render visual imagery in respective display areas in or the lens system. Some examples of such near-eye displays include a waveguide incorporated in the lens assembly to receive light beams from a projector, but a variety of different suitable display mechanisms have been used in other instances.

Near-eye displays such as those typically providing AR experiences in smart glasses are by nature sensitive to the eye positions of a wearer of the glasses. The size of the gap between the near-eye display and the eye during wear, for example, is preferably to be within a specific, relatively small range to enable the display to be properly in focus for the wearer. In practice, however, this eye-display spacing can vary widely due to user preference or other factors, frustrating effective provision of AR display elements.

Another variable that affects subjective quality and accuracy of the near-eye display is variation in lateral distance between the eyes of a wearer. Providing a display area large enough to accommodate the typical range of eye spacings could result in superfluous or out-of-range parts in the display for some users. An additional complication applies for stereoscopic displays in that an illusion of depth created by such displays are by nature dependent on eye position, which can vary greatly between user's having widely divergent head sizes.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

Figure 1:
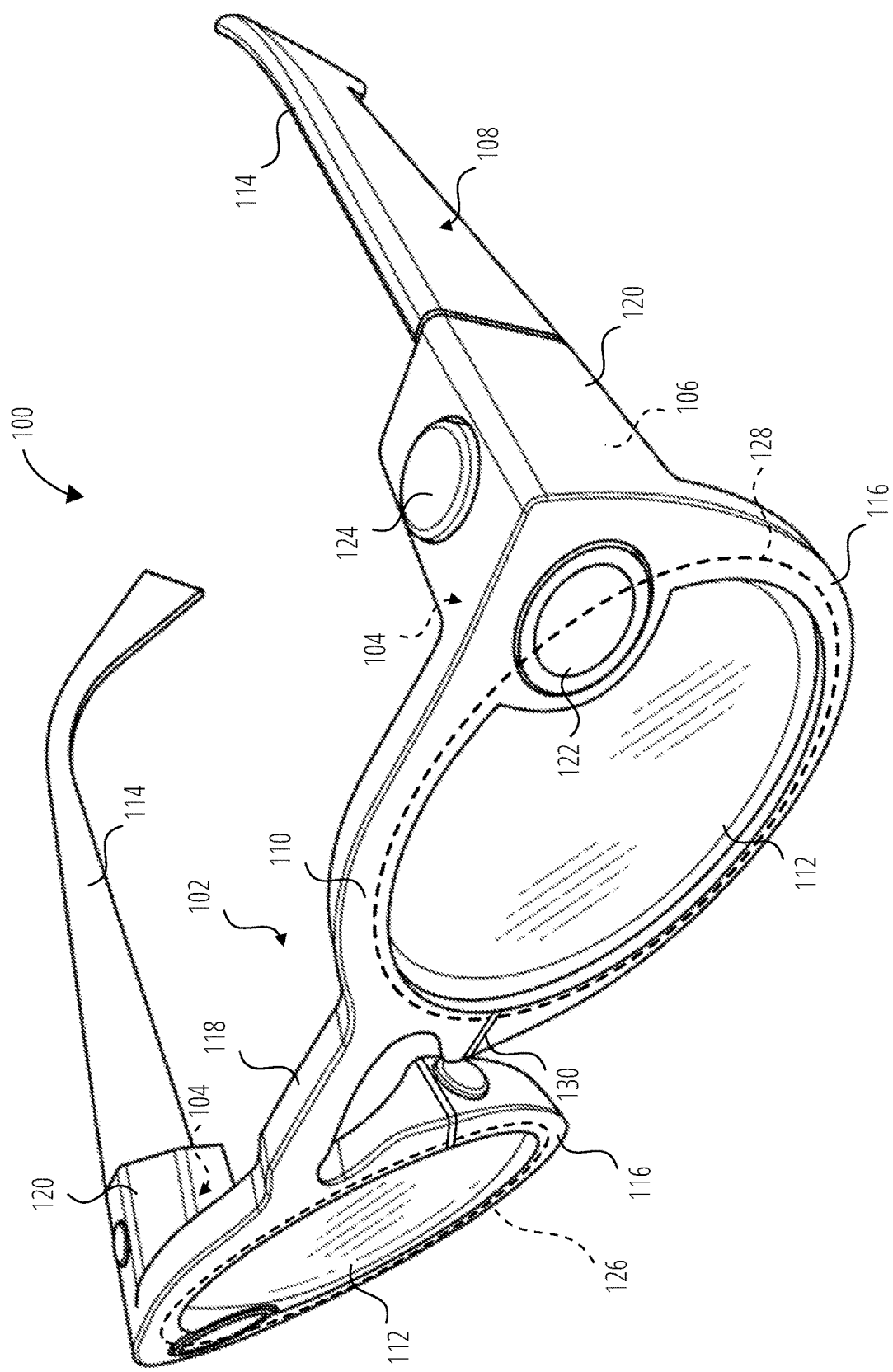
FIG. 1 is a schematic three-dimensional view a head-worn device in the example form of an AR-enabled eyewear device, being smart glasses with native AR capabilities, according to one example.

One aspect of this disclosure provides techniques and mechanisms for, in a wearable optical device (for example, display-enabled or AR glasses) measuring or detecting a number of properties or parameters of the head of a wearer of the device (further occasionally referred to as cephalic parameters) by operation of an integrated head sensor. The disclosure further provides in some examples for autonomous performance device management actions to dynamically adjust or to prompt user adjustment of selected device features based on detected values for the cephalic parameters provided by the head sensor.

As used herein, a wearer of a device is that user (if any) who is currently (i.e., at the relevant time described) wearing the relevant device. Example cephalic parameters detectable by use of the head sensor include head size, distance of the head from the device (in some examples referred to as a frame gap), and head presence or absence from proximity to the device (thus dynamically detecting active wear or non-wear of the device.)

It will be appreciated that some functions or systems of, for example, AR glasses are influenced or affected by variation in value of one or more of the cephalic parameters. Autonomous device management actions are accordingly provided in various examples for such head-influenced functions or features. Thus, for example, optimal near-eye display positioning varies with variation in width spacing between a wearer's eyes. Some examples provide for automated display position adjustment based on detected head size. Head-size in such case is employed as a measured cephalic parameter broadly correlated with eye spacing.

Instead, or in addition, autonomous action in some examples include, based on detection of a current frame gap value, communicating to the wearer a prompt for adjusting the frame gap to a target position/range optimal for viewing of the a near-eye display of the device. Instead, or in addition, autonomous device in some examples include automatic powering down of at least some powered components when no head presence is detected (i.e., when the device is not currently worn), and/or automatic activation integrated display responsive to detecting head presence consistent with operative wear.

The disclosed head sensor is configured to detect and measure ambient absorption of radio frequency (RF) signals proximate the eyewear device at different respective frequencies within a preset target band, and to estimate a current value for one or more of the cephalic parameters based on processing the measured RF absorption data with reference to characteristic RF absorption of the human head.

In some examples the head sensor comprises a loop coupler system comprising a pair of coupler loops connected to a transceiver arrangement to transmit a known feed signal via one of the loops and to read a sympathetically induced response signal via the other loop. Proximate ambient RF absorption characteristics are established by determining, at multiple frequencies across the target band, a difference in amplitude or strength between the feed signal and response signal at the corresponding frequency. Comparatively higher signal loss at a particular frequency is indicative of higher RF absorptivity at that frequency.

In some examples, head size is based on identifying the lossiest frequency for forward transmission. This mechanism is based on the insight that the frequency for maximal RF absorption varies with variation in head size, particularly with variation in head width, being the head dimension most accurately indicative of eye width spacing.

Instead, or in addition, device-head spacing (e.g., frame gap) is estimated based on an amplitude value of the response signal at the lossiest frequency. This mechanism is based on the insight that greater forward transmission losses result from a reduction in the frame gap, and vice versa.

Instead, or in addition, cephalic parameters detected by the head sensor include a wear status, e.g., whether or not the device is currently head-mounted. Wear status is in some examples established by determining whether or not the response signal at any frequency falls below a pre-set threshold. Absence of such below-threshold amplitude value for the response signal indicates absence of a human head proximate the device.

It will thus be seen that, in some aspects, the techniques described herein relate to a device including:
a device body configured to be supported, in use, on the head of a wearer of the device a head sensor including:
a feed conductor housed by the device body;
a response conductor housed by the device body at a location spaced from the feed conductor; and
a transceiver arrangement coupled to the feed conductor and to the response conductor, the transceiver being configured to perform operations including:
transmitting an RF feed signal via the feed conductor; and
reading a response signal induced in the response conductor by the feed signal; and
one or more computer processor devices that forms part of onboard electronics and that is configured to perform operation including:
performing a signal processing procedure to derive, based at least in part on comparison between the feed signal and the response signal, a current value of a head-influenced metric that is variable, in use, as a factor of a cephalic parameter of a wearer on whose head the device is worn; and
identifying and implementing a device management action related to the cephalic parameter.

In some examples, the device is an eyewear device (e.g., display enabled smart glasses or AR glasses) further including a loop coupler system that provides the feed conductor and the response conductor in the form of paired coupler loops, the loop coupler system including: a feed loop driven by the transceiver arrangement to transmit the feed signal; and a response loop coupled to transceiver arrangement to receive the response signal, the response loop being inductively coupled with the feed loop. The device body in such examples includes a lens-carrying eyewear frame, the coupler loops being housed by the eyewear frame such that each of the coupler loops lies in a respective operatively upright plane oriented transversely to an operative viewing direction of the device.

The eyewear frame in some examples holds a laterally spaced pair of lenses, each of the coupler loops extending peripherally about a respective one of the pair of lenses, each coupler loop being substantially co-planar with the respective lens. In some such examples, each coupler loop is provided by a respective metal ring extending around the associated lens. One or both of the coupler loop-lens rings in some example function as unlockable lens retainers, being held captive in a respective lens rim and, when locked, in turn obstructing the respective lens from removal from its lens rim. In yet further embodiments, such one or both of the coupler loop lens rings is additionally connected to and forms part of an antenna system for transceiving wireless communications signals, in some examples providing Bluetooth or WiFi antenna functionality.

The onboard electronics is in some examples configured to perform the signal processing procedure based at least in part on analyzing a parameter indicative of comparative forward transmission efficiency across a spectral range that spans a target band of RF frequencies characteristically associated with absorption by human heads. Differently worded, the signal processing identifies a respective extent of signal loss or RF absorption at each of multiple different frequencies spanning RF frequencies typically associated with head-absorption.

In some examples, cephalic parameter(s) determined by the head sensor includes wear status, indicating whether or not the eyewear device is currently worn. In some such examples, the applicable head-influenced metric, from which the cephalic parameter of wear status is derived, is based on or related to minimum response signal amplitude value or maximum loss feed-response coupling within the signal's spectral range. The onboard electronics is in some such examples configured to derive the wear status by operations including: (a) determining that the device is currently worn conditional upon identification of feed-response coupling at a frequency within the target band as falling below a predefined threshold; and (b) determining that the device is currently unworn if feed-response coupling is above-threshold in strength across the spectral range.

In such examples, the device management action in some instances includes, responsive to determining, while an integrated near-eye display of the eyewear device is de-activated, that the device is currently worn, automatically activating the near-eye display. Instead, or in addition, device management actions triggered by wear status in some examples include automatically powering down at least some of the onboard electronics and/or system responsive to determining a negative wear status.

Instead, or in addition, the cephalic parameter(s) detected via the head sensor in some examples includes a frame gap, being defined by a transverse spacing in a viewing direction between the eyewear frame and the wearer's head. In the case of, for example, AR glasses, frame gap value often corresponds to or indicates how far an integrated near-eye display is from the wearer's eyes. In some such examples, the applicable head-influenced metric, from which the cephalic parameter of wear gap is derived, is based on or related to the magnitude of response signal amplitude (or, inversely, the extent of feed-response signal loss) at the lossiest frequency (being the particular frequency in the signal's spectral range where feed-response coupling is weakest). The onboard electronics is thus in some examples configured to derive the head-influenced metric indicative of a current frame gap value by a procedure including, at least in part, determining a response signal amplitude at a lossiest frequency within the target band, thus identifying a minimum amplitude for the response signal in the target band. In some such examples, related device management actions comprise: (a) determining that the minimum amplitude transgresses a threshold of a predefined target frame that facilitates visual clarity, in wearer perspective, of a near-eye display incorporated in the eyewear device; and (b) automatically communicating to the wearer an adjustment prompt to change the transverse spacing between the eyewear frame and the wearer's head.

Instead, or in addition, the cephalic parameter(s) detected via the head sensor in some examples include head size, quantifying one or more dimensions of the wearer's head. In some examples, the head size parameter indicates a head width or a facial width of the wearer. In some such examples, the applicable head-influenced metric, from which the cephalic parameter of head size is derived, is based on or related to the frequency value of the lossiest frequency for the feed signal in its spectral range. The current value for the head-influenced metric is thus in some examples derived in a procedure that includes, at least in part: (a) identifying a lossiest frequency, being that frequency in the target band at which signal loss between the feed loop and the response loop is greatest; and (b) estimating a current head size value based on the lossiest frequency of the response signal. In some such examples, the estimating of the current head size value includes a lookup operation using the lossiest frequency as reference value in interrogation of lookup data (e.g., a lookup table) including multiple values for lossiest frequency correlated to different respective head size values.

In some such examples, autonomous responsive device management actions include adjusting display position of a near-eye display according to the wearer's head size, which thus serves as proxy for eye position. Such display adjustment in some examples include: (a) based on the current head size value, identifying for activation a particular sub-portion of an available display area provided by an integrated near-eye display; and (b) autonomously activating the particular sub-portion of an available display area of the near-eye display, thereby adjusting display position of the near-eye display based on the wearer's head size.

In some aspects, the techniques described herein relate to a method including: (a) using a feed conductor incorporated in a head-worn device, transmitting an RF feed signal; (b) reading a response signal induced by the feed signal in a response conductor that is incorporated in the device; (c) in an automated operation performed by onboard electronics including one or more computer processor devices processors housed by the device, performing a signal processing procedure to derive, based at least in part on comparison between the feed signal and the response signal, a current value of a head-influenced metric that is variable as a factor of a cephalic parameter pertaining to a wearer's head, on which the device is currently worn; and (d) in an autonomous operation performed by the onboard electronics based at least in part on the current value of the head-influenced metric, identifying and implementing a device management action related to the cephalic parameter. Different examples of such a method include the example variations and features mentioned above with respect to examples of the device-related aspects of the disclosed techniques.

The device is in some examples an eyewear device including a lens-carrying eyewear frame; wherein the device further includes a loop coupler system having a pair of coupler loops which serve as the feed conductor and the response conductor respectively, each coupler loop extending circumferentially about an associated lens held by the eyewear frame; and wherein the signal processing procedure is based at least in part on analyzing variation in feed-response coupling across a spectral range that spans a target band of RF frequencies characteristically associated with absorption by the human head.

In some examples the method further includes identifying a wear status of the eyewear device, indicating whether or not the eyewear device is currently worn, identification of the wear status including: (a) establishing whether or not feed-response coupling efficiency falls below a predefined threshold for any frequency within the target band; (b) responsive to and conditional upon establishing that the feed-response coupling includes a below-threshold value with the target band, determining that the eyewear device is currently worn; and (c) responsive to and conditional upon establishing that the feed-response coupling does not transgress the threshold within the target band, determining that the eyewear device is currently unworn. The method may in some such examples include performing a device management action that includes, responsive to determining, while an integrated near-eye display of the eyewear device is de-activated, that the device is currently worn, automatically activating the near-eye display.

In examples, the signal processing procedure includes: (a) determining a response signal amplitude at a lossiest frequency within the target band, thus identifying a minimum amplitude for the response signal in the target band; and (b) based on the minimum amplitude of the response signal, estimating a current value for a frame gap defined by a transverse spacing in a viewing direction between the eyewear frame and the wearer's head. In some such example, the device management action includes: (a) determining that the minimum amplitude transgresses a threshold of a predefined target frame gap that facilitates visual clarity, in wearer perspective, of a near-eye display incorporated in the eyewear device; and (b) automatically communicating to the wearer an adjustment prompt to change the transverse spacing between the eyewear frame and the wearer's head.

In some examples, the method includes: (a) identifying a lossiest frequency, being that frequency in the target band at which signal loss between the feed loop and the response loop is greatest; and (b) estimating a current value for wearer head size based on the lossiest frequency of the response signal. The device management action in some such examples includes: (a) based on the current head size value, identifying for activation a particular sub-portion of an available display area provided by the near-eye display; and (b) autonomously activating the particular sub-portion of an available display area of the near-eye display, thereby adjusting display position of the near-eye display based on the wearer's head size.

Other technical features may be readily apparent to one skilled in the art from the following figures, descriptions, and claims.

Figure 7:
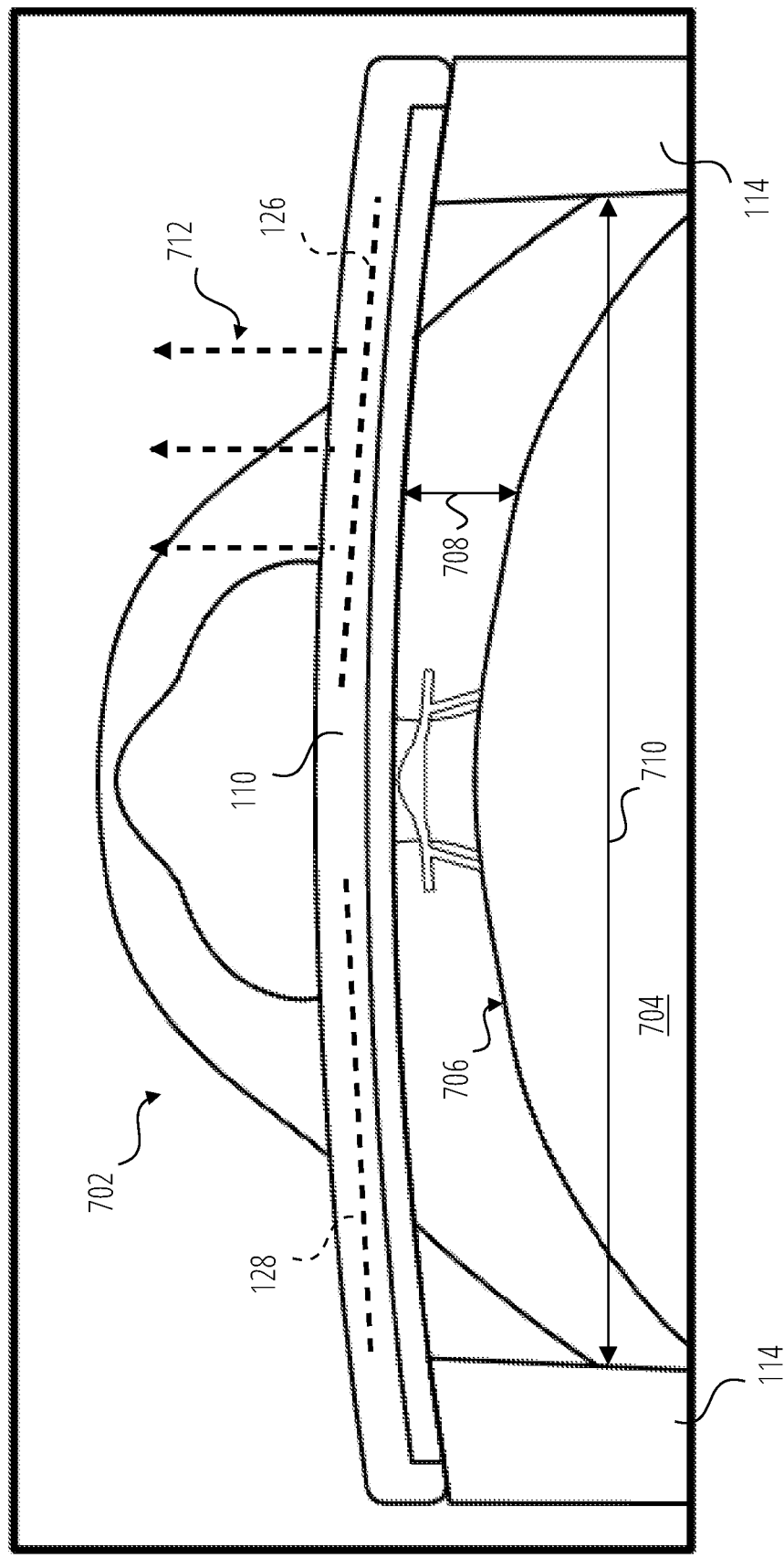
FIG. 7 is a schematic top view of a user wearing AR glasses consistent with the examples of FIG. 1 and FIG. 2, according to one example.

Turning now to a more detailed description of a particular example embodiment, FIG. 1 shows an oblique front view of a head-worn device in the example form of a display-enabled eyewear device, in this example provided by a pair of smart glasses 100. The glasses 100 has a native display system 104 providing a near-eye display capable of supporting AR functionality, thus being AR glasses. The AR glasses 100 has an integrated head sensor 102 capable of measuring or detecting a number of properties or parameters of the head (i.e., cephalic parameters) of a wearer of the AR glasses 100. Example cephalic parameters detectable by use of the head sensor 102 include head size, distance of the head from the device, and head presence or absence (thus detecting active wear or the absence thereof), as described at greater length later herein described with reference to FIG. 7 (which shows a top view of the head 704 of a wearer 702 of the example AR glasses 100). As used herein, a wearer of a device is that user (if any) who is currently (i.e., at the relevant time described) wearing the relevant device.

Onboard electronics 106 of the AR glasses 100 includes a computer processor that is in communication with the head sensor 102 and that is configured to provide device management functionality for autonomously performing device management actions to adjust or to prompt adjustment of selected features of the AR glasses 100 based on head parameter values detected by the head sensor 102. As will be described at length later herein, such autonomous adjustments responsive to measure head parameters include, but is not limited to, variation in position of the near-eye display based on measured head size, prompting adjustment spacing of the AR glasses 100 from the wearer's face 706 (referred to as the frame gap; see FIG. 7), automatic powering down of at least some powered components when no head presence is detected (i.e., when the AR glasses 100 are not worn), and automatic activation of the display system 104 responsive to detecting head presence consistent with operative wear of the AR glasses 100.

A body 108 of the AR glasses 100 includes a front piece or eyewear frame 110 and a pair of temples 114 hingedly connected to the frame 110 for supporting the AR glasses 100 in position on a user's face when the temples 114 are in an extended or wearable configuration, as shown in FIG. 1, to receive the user's head 704 between them. In some examples the entire frame 110 can be formed from a single piece of material so as to have a unitary or integral construction. The frame 110 is in this example embodiment a metal component of unitary or monolithic construction. In other embodiments, the frame 110 is at least partially provided by one or more substantially rigid molded components formed of a polymeric plastics material.

The AR glasses 100 include a bilateral pair of optical elements in the form of respective lenses 112 housed by the frame 110. The lenses 112 are held in the frame 110 in typical eyewear-fashion such that, during wear, the lenses 112 are positioned closely before the eyes, so that the wearer's field of view is occupied substantially completely by the lenses 112. Note that the lenses 112 are in some example composite lenses comprising a number of stacked optical elements. In this example, each lens 112 moreover comprises a lens assembly configured to serve not only the basic functions of conventional eyewear lenses, but additionally to provide or enable integrated display capabilities, hosting respective display areas 210 of the display system 104 (see FIG. 2). The lens assemblies 114 are held on the frame 110 in the respective lens rims 116 defined by the frame 110.

The head sensor 102 in this example provided at least in part by a loop coupler system comprising a pair of coupler loops provided by (a) a feed conductor in the example form of a feed loop 126 and (b) a response conductor in the form of a response loop 128. As will be discussed further with reference to FIG. 2, the coupler loops are coupled to a transceiving arrangement to transmit a feed signal and measure a corresponding induced response signal. The feed-response signals are processed to estimate one or more cephalic parameters indicated by frequency-space amplitude loss in forward transmission.

The AR glasses 100 is in this example configured for wireless communication with external electronic components or devices, to which end the onboard electronics 106 includes an antenna system integrated in the frame 110. In some examples, one or both of the feed loop 126 and response loop 128 form part of the communications antenna system, thus providing wireless data transmission functionality in addition to feed-response head-sensing functions as disclosed. In this example, the feed loop 126 forms part of the communications antenna system, being employed as a Wi-Fi antenna for data communications in a corresponding frequency domain.

In the present example, each of the feed loop 126 and the response loop 128 are each provided by an interrupted annular metal strip shaped and configured additionally to serve the structural function of removably and replaceably retaining the associated lens 112 in the corresponding lens rim 116. Worded differently, the feed loop 126 and response loop 128 in this example each provides a lens retainer mechanism or lens ring.

In this example embodiment, each coupler loop 126, 128 is located in a circumferentially extending channel in a radially inner surface of the lens rim 116, so that the coupler loop 126, 128 extends circumferentially around the periphery of the lens 112, being selectively engageable with the radially outer periphery of the associated lens 112 to retain it in the respective lens rim 116. The lens ring provided by the respective coupler loop 126, 128 is disposable between a locked condition, in which it is tightened into contact with the radial edge of the lens 112 to keep it in the lens rim 116, and an unlocked condition in which the coupler loop 126, 128 is somewhat dilated, allowing lens removal and replacement.

Figure 2:
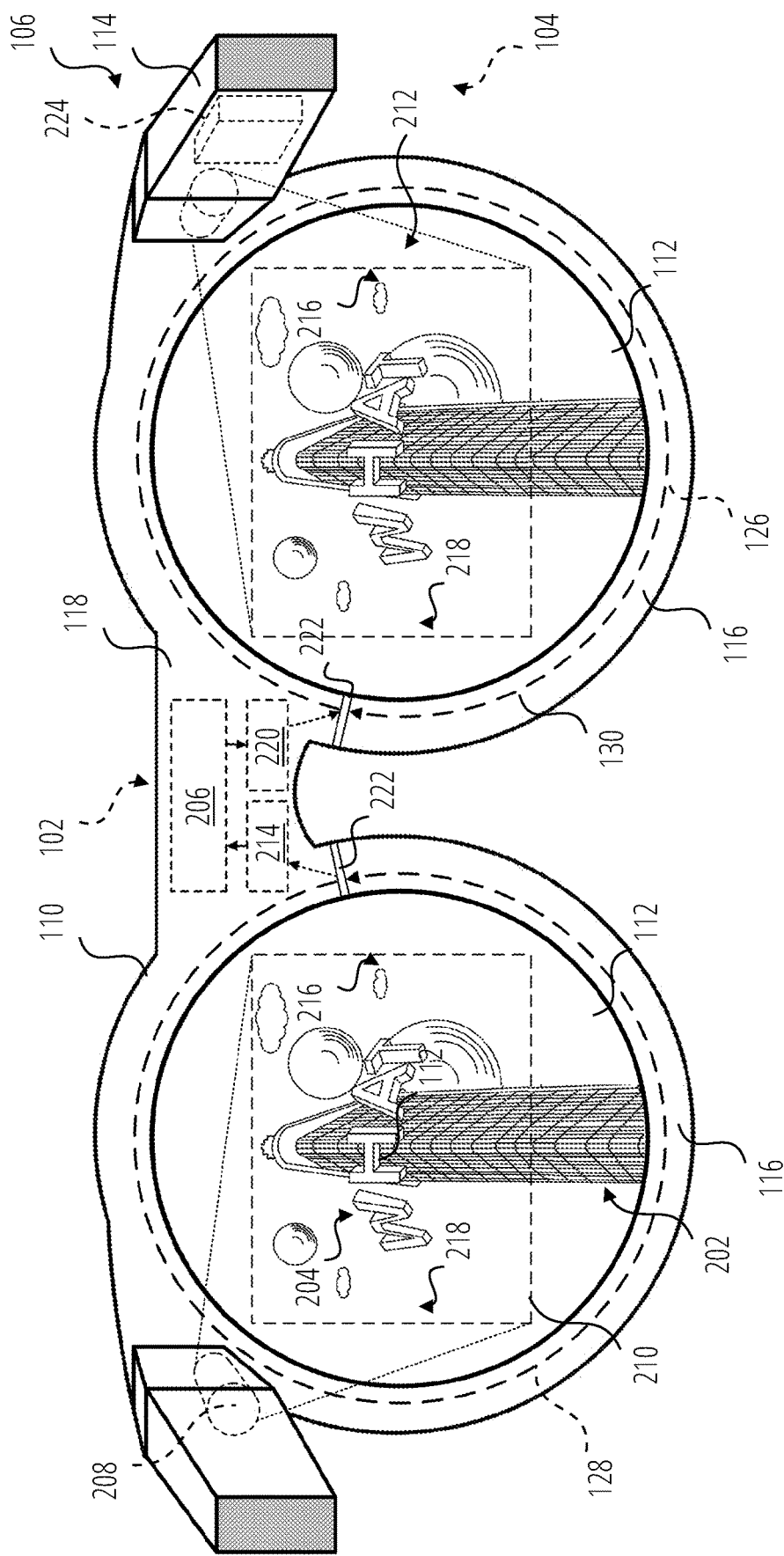
FIG. 2 shows a wearer's perspective view of AR glasses corresponding to that of FIG. 1, according to one example.

FIG. 2 schematically shows additional components of a head sensing system provided at least in part by the head sensor 102. For example, it will be seen that the head sensor 102 incudes a transceiver arrangement comprising a transmitter 220 connected to the feed loop 126 and a receiver 214 connected to the response loop 128. Note that each coupler loop 126, 128 is non-continuous, being interrupted by a discontinuity provided by respective feed slits 222 created in the metal loop element and lens rim 116. Respective feed points of the coupler loops 126, 128 to the transmitter 220 and receiver 214 are located at the respective feed slits 222. The feed slits 222 are in this example filled with a plastics material while internally allowing for electrical connection transceiver arrangement.

A 214 is in this example coupled to the transmitter 220 and receiver 214. The 214 comprises circuitry and/or a processing device configured to derive measured values of one or more cephalic parameters by comparative processing of the feed-and-response signals. The 214 is in communication a device management controller 224 forming part of the on-board electronics and being configured to autonomously implement device adjustment or customization specific to one more measured cephalic parameters of the wearer.

The transceiver arrangement and 214 are in this example housed in a bridge 118 defined by the frame between the lens rims 116, thus reducing routing complexity. In other examples, functionalities of the 214 and the device management controller 224 are provided by one or more correspondingly programmed processors forming part of the onboard electronics 106 (e.g., provided by the high-speed circuitry 314 of FIG. 3).

In operation, RF energy from the transmitter 220 feeds the feed loop 126. This energy causes generation of feed-side H-fields 712 (see FIG. 7) that are perpendicular to the metal frame 110, as represented by dotted arrows in the plan view of FIG. 7. These H-fields then travel through air and are picked up by the response loop 128. The captured H-fields create a current on the feed point of the response loop 128, in turn causing a response on the receiver and thus providing a measured response signal. In other examples, the transmitter 220 and receiver 214 are incorporated into a single transceiver indirectly coupled to the coupler loops 126, 128 via a circulator. The transmitter 220 is in some examples an established RF system, such as WiFi. The receiver 214 can even in such examples be a simple RF detector circuit.

The frame 110 defines a pair of end portions 120 at opposite lateral extremities of the frame 110, the end portions 120 providing respective interior spaces in which at least part of onboard electronics 106 is housed. In this example, a variety of electronic components are housed in one or both of the end portions 120. Some components of the onboard electronics 106 are also housed in the main portion of the frame 110 and the temples 114.

The onboard electronics 106 can include one or more processors with memory, wireless communication circuitry, and a power source. As discussed below with reference to FIG. 4, the onboard electronics 106 comprises low-power circuitry, high-speed circuitry, a display processor, signal processing components for deriving head parameters from the feed- and response signals, and a device controller configured to perform autonomous adjustment actions as a function of measure cephalic parameters currently applicable. Various other examples may include these elements in different configurations or integrated together in different ways. The electronics 106 additionally includes an on-board battery or other suitable portable power supply. The onboard electronics 106 includes a connector or port (not shown) suitable for charging the battery, a wireless receiver, transmitter or transceiver (not shown), or a combination of such devices.

The AR glasses 100 are camera-enabled, in this example comprising pair of cameras 122 mounted on the frame 110 and facing forwards so as to be aligned broadly with the direction of view of a wearer. The cameras 1222 are configured to capture digital photo as well as digital video content. Although two cameras are depicted, other examples contemplate the use of a single or additional (i.e., more than two) cameras. In one or more examples, the AR glasses 100 include any number of input sensors or other input/output devices in addition to the cameras 122. In this example, onboard sensors provided by the onboard electronics 106 include, in addition to the head sensor 102, biometric sensors, location sensors, and motion sensors.

The AR glasses 100 further includes one or more input and output mechanisms permitting communication with and control of various functionalities provided by the onboard electronics 106, including camera-, display-, and optical screening functionalities. In this example, the input mechanism comprises a pair of push button 124 mounted on the frame 110 so as to be accessible on top the respective end portions 120 for pressing by the user. Additional and/or alternative user input mechanisms may in other embodiments be provided by, for example, one or more touchpads for receiving haptic input, e.g., being located on one or both temples 114. Instead or in addition, some examples provide for control of one or more device functions by tap sequences applied manually to the body 108 of the AR glasses 100.

FIG. 2 illustrates the AR glasses 100 from the perspective of a wearer. For clarity, a number of the elements shown in FIG. 1 have been omitted. As described in FIG. 1, an optical arrangement of the AR glasses 100 comprises a laterally spaced pair of composite lenses 112 secured within respective lens rims 116 provided by the frame 110.

The display system 104 in this example provides a near-eye display 212 hosted by and integrated with the lenses 112. In this example, the near-eye display 212 comprises a pair of laterally symmetrical forward optical assemblies housed in the respective end portions 120, each forward optical assembly comprising a projector 208 coupled with the associated lens 112 to present visual imagery in a corresponding generally rectangular display area 210 on the associated lens 112. Each lens 112 thus has a dedicated projector 208 servicing a respective display area 210, as can best be seen in FIG. 2.

In this example, the near eye displays 212 are provided with at least part each composite lens 112 serving as waveguide combiner. To this end, each fixed-lens waveguide has an input region and an output region provided by diffractive surface relief gratings, with the display areas 210 being defined by the corresponding surface relief gratings. The waveguides include reflective or diffractive structures (e.g., gratings and/or optical elements such as mirrors, lenses, or prisms). Projected light from the projector 208 thus enters the waveguide provided by the lens 112 at the input region adjacent the periphery of the lens 112, travels via the lens 112 waveguide-fashion to encounter the diffractive structures defining the display area 210. The diffractive structures of the display area 210 define individually illuminable display pixels, each of which redirects light projected to it from the projector towards a corresponding eye of the wearer, thus providing a finely pixelated color image coincident with the lens 112 from the wearer's perspective. It will be appreciated that the display thus provided in the display area 210 is transparent, so displayed content is seen as overlaid on the visible environment. It will be appreciated however that other display technologies or configurations may be provided that can display an image to a user in a forward field of view. For example, instead of a projector 208 and a waveguide, an LCD, LED or other display panel or surface may be provided instead.

The near-eye display 212 is thus capable of rendering AR objects 204 that appear overlaid on the real-world environment 202. In this example, the AR objects 204 are rendered with stereoscopic effects in the left- and right display areas 210, so that they appear three-dimensional and located at depth with the ambient real-world environment 202. Visual content displayable by the near-eye display 212 in an AR mode is not limited to stereoscopic and/or overlaid AR content, but also includes conventional 2D material, e.g., graphical user interfaces, photos and video content such as movies, TV, sports event, and online video clips or social media stories.

In this example, display areas 210 as illustrated show a full area available for display (i.e., in which display pixels are located), which in this example is larger in lateral and in pixel count that than an active display area for "full screen" display. Worded differently, the full extent of an active display area is in this example provided by a sub-portion of the full available display area 210. Such an oversized display area 210 effectively allows adjustment or variation in position relative to the frames 110 of the respective near-eye displays 212 by activating pixels in a sub-portion identified as active display area and de-activating pixels outside of that sub-portion.

In this example, display position of the active display area is laterally adjustable (i.e., leftwards are rightwards from wearer perspective) by selective activation and deactivation of outer pixels 216 and inner pixels 218 lying respectively in a laterally outer and a laterally inner vertical rectangular strip of the corresponding display area 210.

Users with relatively wide-set eyes experience optimal display quality for near-eye displays (and particularly for AR display elements) at relatively greater lateral spacing between the active display areas, and vice versa. Provision of the selectively activatable outer pixels 216 and inner pixels 218 allows display position adjustment by effectively moving the active display areas (i.e., the left- and right activated sub-portions) closer together or further apart based on detected head size or width, which is generally indicative of individual eye-spacing.

System with Electronics-Enabled Eyewear

Figure 3:
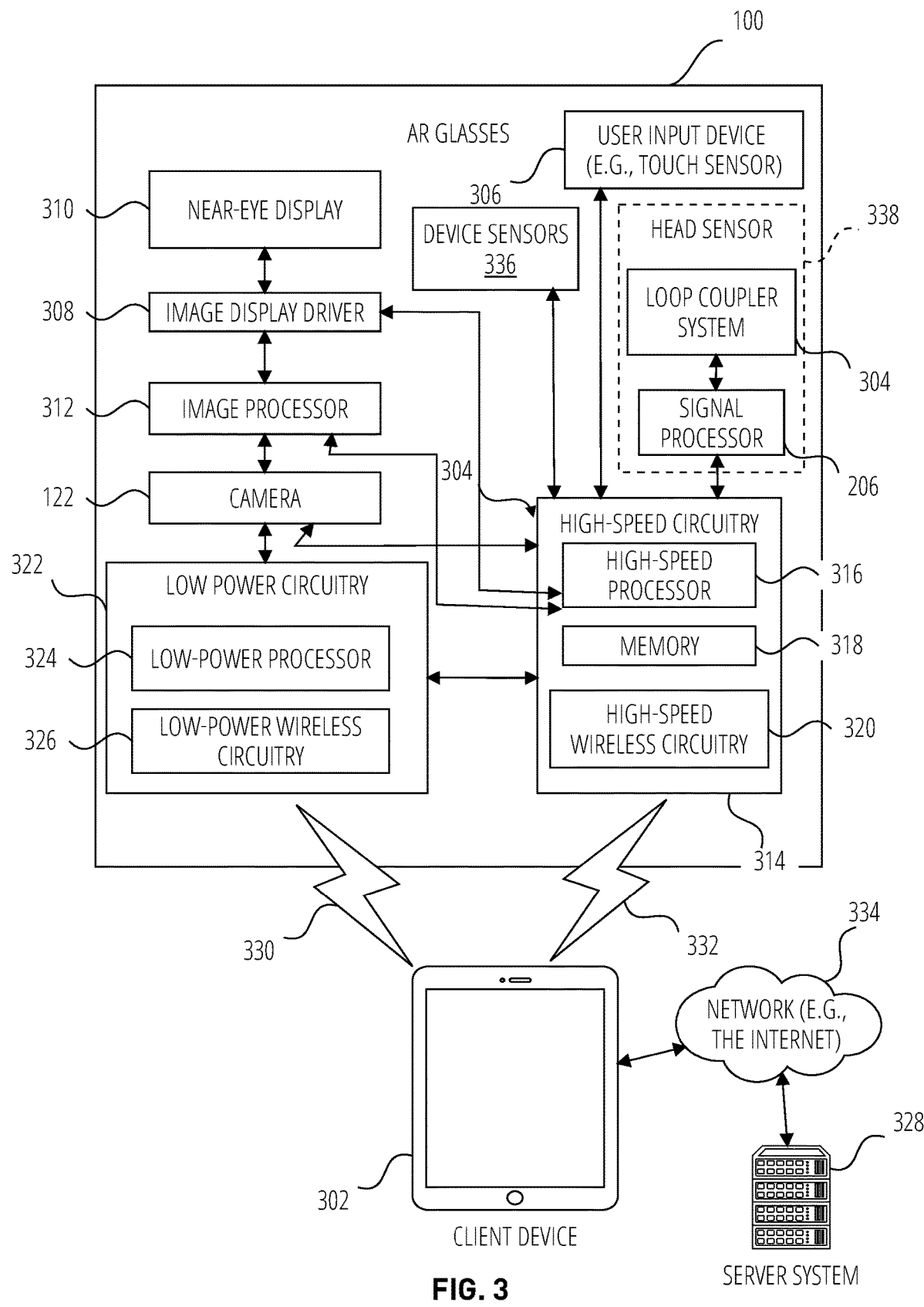
FIG. 3 is a block diagram illustrating a networked system including a wearable AR device such as that of FIG. 1, in accordance with one example.

FIG. 3 illustrates a system in which electronics-enabled eyewear such as the example AR glasses 100 can be implemented according to one example. FIG. 3 is a high-level functional block diagram of an example pair of AR glasses 100 communicatively coupled a mobile client device 302 and a server system 328 via various networks 334.

As discussed briefly previously, AR glasses 100 includes at least one camera 122, a near-eye display 212, an optical loop coupler system 304, and a signal processor 206 for autonomous control of the loop coupler system 304.

Client device 302 may be a smartphone, tablet, phablet, laptop computer, access point, or any other such device capable of connecting with the AR glasses 100 using either or both of a low-power wireless connection 330 and a high-speed wireless connection 332. Client device 302 is connected to server system 328 and network 334. The network 334 may include any combination of wired and wireless connections.

AR glasses 100 further includes two image displays of the near-eye display 212. The two image displays include one associated with the left lateral side and one associated with the right lateral side of the AR glasses 100. AR glasses 100 also includes image display driver 308, image processor 312, low power circuitry 322, and high-speed circuitry 314. Near-eye display 212 is configured for presenting images and videos, including an image that can include a graphical user interface to a user of the AR glasses 100.

Image display driver 308 commands and controls the image display of the near-eye display 212. Image display driver 308 may deliver image data directly to the image display of the near-eye display 212 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, AR glasses 100 includes a frame 110 and stems (or temples) extending from a lateral side of the frame 110. AR glasses 100 further includes one or more user input devices 306, in this example including a touch sensor and push buttons 124. The user input device 306 (e.g., touch sensor or push button) is to receive from the user an input selection to manipulate the graphical user interface of the presented image.

The components shown in FIG. 3 for the AR glasses 100 are located on one or more circuit boards, for example a PCB or flexible PCB, in the rims or temples. Alternatively or additionally, the depicted components can be located in the chunks, frames, hinges, or bridge of the AR glasses 100. Left and right cameras 122 can include digital camera elements such as a complementary metal-oxide-semiconductor (CMOS) image sensor, charge coupled device, or any other respective visible or light capturing elements that may be used to capture data, including images of scenes with unknown objects.

AR glasses 100 includes a memory 318 which stores instructions to perform a subset or all of the functions described herein. Memory 318 can also include storage device. Memory 318 in this example stores instructions for dynamic autonomous mode switching, implementing the signal processor 206 via execution of the instructions by high-speed circuitry 314.

As shown in FIG. 3, high-speed circuitry 314 includes high-speed processor 316, memory 318, and high-speed wireless circuitry 320. In the example, the image display driver 308 is coupled to the high-speed circuitry 314 and operated by the high-speed processor 316 in order to drive the left and right image displays of the near-eye display 212. High-speed processor 316 may be any processor capable of managing high-speed communications and operation of any general computing system needed for AR glasses 100. High-speed processor 316 includes processing resources needed for managing high-speed data transfers on high-speed wireless connection 332 to a wireless local area network (WLAN) using high-speed wireless circuitry 320. In certain examples, the high-speed processor 316 executes an operating system such as a LINUX operating system or other such operating system of the AR glasses 100 and the operating system is stored in memory 318 for execution. In addition to any other responsibilities, the high-speed processor 316 executing a software architecture for the AR glasses 100 is used to manage data transfers with high-speed wireless circuitry 320. In certain examples, high-speed wireless circuitry 320 is configured to implement Institute of Electrical and Electronic Engineers (IEEE) 1002.11 communication standards, also referred to herein as Wi-Fi. In other examples, other high-speed communications standards may be implemented by high-speed wireless circuitry 320.

Low-power wireless circuitry 326 and the high-speed wireless circuitry 320 of the AR glasses 100 can include short range transceivers (Bluetooth™) and wireless wide, local, or wide area network transceivers (e.g., cellular or WiFi). Client device 302, including the transceivers communicating via the low-power wireless connection 330 and high-speed wireless connection 332, may be implemented using details of the architecture of the AR glasses 100, as can other elements of network 334.

Memory 318 includes any storage device capable of storing various data and applications, including, among other things, camera data generated by the left and right cameras 122, signal processor 206, and the image processor 312, as well as images generated for display by the image display driver 308 on the image displays of the near-eye display 212. While memory 318 is shown as integrated with high-speed circuitry 314, in other examples, memory 318 may be an independent standalone element of the AR glasses 100. In certain such examples, electrical routing lines may provide a connection through a chip that includes the high-speed processor 316 from the image processor 312 or low-power processor 324 to the memory 318. In other examples, the high-speed processor 316 may manage addressing of memory 318 such that the low-power processor 324 will boot the high-speed processor 316 any time that a read or write operation involving memory 318 is needed.

As shown in FIG. 3, the low-power processor 324 or high-speed processor 316 of the AR glasses 100 can be coupled to the camera 122, loop coupler system 304, the low-power processor 324 and/or high-speed processor 316 thus at least in part providing the signal processor 206), the image display driver 308, the user input device 306 (e.g., touch sensor or push button), and the memory 318.

AR glasses 100 is connected with a host computer. For example, the AR glasses 100 is paired with the client device 302 via the high-speed wireless connection 332 or connected to the server system 328 via the network 334. Server system 328 may be one or more computing devices as part of a service or network computing system, for example, that include a processor, a memory, and network communication interface to communicate over the network 334 with the client device 302 and AR glasses 100.

The client device 302 includes a processor and a network communication interface coupled to the processor. The network communication interface allows for communication over the network 334, low-power wireless connection 330 or high-speed wireless connection 332. Client device 302 can further store at least portions of the instructions for autonomous and/or user-directed opacity control functionalities via the optical loop coupler system 304 described herein. Thus, in some examples, opacity control may be performed entirely on-device at the AR glasses 100. In other embodiments, at least part of the signal processor 206 may be provided by the connected client device 302. In one such embodiment, the client device 302 has installed thereon a Machine-Learning Model (ML Model) derived from a neural network trained with use-case training data pertaining to sensor date and use-case data in which optical screening is appropriate or was manually/selective implemented by users. The ML model in such cases autonomously triggers switching of the loop coupler system 304 and hence the lenses 112 between different optical modes as described herein and as discussed briefly with reference to FIG. 6 below. In some embodiments, such an ML model may be implemented by an on-device signal processor 206. In yet further embodiments, autonomous opacity control may be provided at least in part by the server system 328, e.g., by use of a continuously updated AI system implemented by the server system 328 to control multiple AR glasses 100 in communication therewith via the network 334.

Output components of the AR glasses 100 include visual components, such as a the near-eye display 212 and/or a light emitting diode (LED) display. The image displays of the near-eye display 212 are driven by the image display driver 308. The output components of the AR glasses 100 further include acoustic components (e.g., speakers), haptic components (e.g., a vibratory motor), other signal generators, and so forth. The input components of the AR glasses 100, the client device 302, and server system 328, such as the user input device 306, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., the buttons 124, a touch screen that provides location and force of touches or touch gestures, or other tactile input components), audio input components (e.g., a microphone), and the like.

AR glasses 100 may optionally include additional peripheral device elements. Such peripheral device elements may include on-board device sensors 336, in this example including biometric sensors, motion sensors, and location sensors integrated with AR glasses 100. For example, peripheral device elements may include any I/O components including output components, motion components, position components, or any other such elements described herein.

For example, the biometric components of the device sensors 336 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components of the device sensors 336 include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 330 and high-speed wireless connection 332 from the client device 302 via the low-power wireless circuitry 326 or high-speed wireless circuitry 320.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Networked Computing Environment

Figure 4:
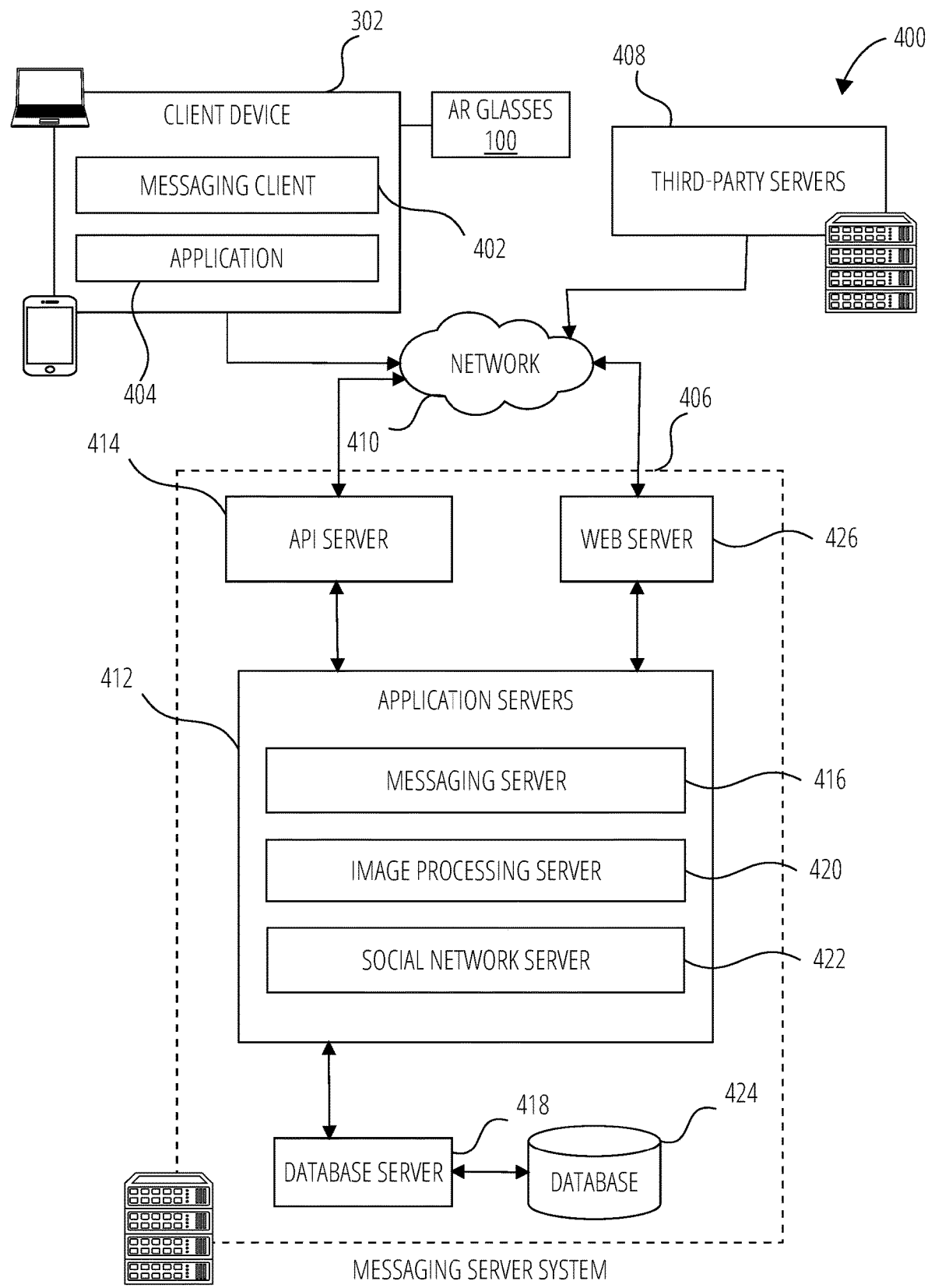
FIG. 4 is a diagrammatic representation of a networked environment in which the present disclosure may be deployed, in accordance with some examples.

FIG. 4 is a block diagram showing an example messaging system 400 for exchanging data (e.g., messages and associated content) over a network. The messaging system 400 includes multiple instances of a client device 302 analogous to that exemplified with reference to FIG. 3, each of which hosts a number of applications, including a messaging client 402 and other applications 404. In this example, the client device 302 is a mobile phone coupled to a pair of AR glasses 100 similar to that described with reference to FIG. 1-FIG. 3. In other examples, the client device 302 may be provided by the AR glasses 100 themselves.

Each messaging client 402 is communicatively coupled to other instances of the messaging client 402 (e.g., hosted on respective other client devices 302), a messaging server system 406 and third-party servers 408 via a network 410 (e.g., the Internet). A messaging client 402 can also communicate with locally-hosted applications 404 using Applications Program Interfaces (APIs). In some examples, the messaging client 402 can be provided by a wearable device such as the AR glasses 100 of FIG. 1, a client device 302 such as that of FIG. 3, or a combination thereof.

A messaging client 402 is able to communicate and exchange data with other messaging clients 402 and with the messaging server system 406 via the network 410. The data exchanged between messaging clients 402, and between a messaging client 402 and the messaging server system 406, includes functions (e.g., commands to invoke functions) as well as payload data (e.g., text, audio, video or other multimedia data).

The messaging server system 406 provides server-side functionality via the network 410 to a particular messaging client 402. While certain functions of the messaging system 400 are described herein as being performed by either a messaging client 402 or by the messaging server system 406, the location of certain functionality either within the messaging client 402 or the messaging server system 406 may be a design choice. For example, it may be technically preferable to initially deploy certain technology and functionality within the messaging server system 406 but to later migrate this technology and functionality to the messaging client 402 where a client device 302 has sufficient processing capacity.

The messaging server system 406 supports various services and operations that are provided to the messaging client 402. Such operations include transmitting data to, receiving data from, and processing data generated by the messaging client 402. This data may include message content, client device information, geolocation information, media augmentation and overlays, message content persistence conditions, social network information, and live event information, as examples. Data exchanges within the messaging system 400 are invoked and controlled through functions available via user interfaces (UIs) of the messaging client 402.

Turning now specifically to the messaging server system 406, an Application Program Interface (API) server 414 is coupled to, and provides a programmatic interface to, application servers 412. The application servers 412 are communicatively coupled to a database server 418, which facilitates access to a database 424 that stores data associated with messages processed by the application servers 412. Similarly, a web server 426 is coupled to the application servers 412, and provides web-based interfaces to the application servers 412. To this end, the web server 426 processes incoming network requests over the Hypertext Transfer Protocol (HTTP) and several other related protocols.

The Application Program Interface (API) server 414 receives and transmits message data (e.g., commands and message payloads) between the client device 302 and the application servers 412. Specifically, the Application Program Interface (API) server 414 provides a set of interfaces (e.g., routines and protocols) that can be called or queried by the messaging client 402 in order to invoke functionality of the application servers 412. The Application Program Interface (API) server 414 exposes various functions supported by the application servers 412, including account registration, login functionality, the sending of messages, via the application servers 412, from a particular messaging client 402 to another messaging client 402, the sending of media files (e.g., images or video) from a messaging client 402 to a messaging server 416, and for possible access by another messaging client 402, the settings of a collection of media data (e.g., story), the retrieval of a list of friends of a user of a client device 302, the retrieval of such collections, the retrieval of messages and content, the addition and deletion of entities (e.g., friends) to an entity graph (e.g., a social graph), the location of friends within a social graph, and opening an application event (e.g., relating to the messaging client 402).

The application servers 412 host a number of server applications and subsystems, including for example a messaging server 416, an image processing server 420, and a social network server 422. The messaging server 416 implements a number of message processing technologies and functions, particularly related to the aggregation and other processing of content (e.g., textual and multimedia content) included in messages received from multiple instances of the messaging client 402. As will be described in further detail, the text and media content from multiple sources may be aggregated into collections of content (e.g., called stories or galleries). These collections are then made available to the messaging client 402. Other processor and memory intensive processing of data may also be performed server-side by the messaging server 416, in view of the hardware requirements for such processing.

The application servers 412 also include an image processing server 420 that is dedicated to performing various image processing operations, typically with respect to images or video within the payload of a message sent from or received at the messaging server 416.

The social network server 422 supports various social networking functions and services and makes these functions and services available to the messaging server 416. To this end, the social network server 422 maintains and accesses an entity graph within the database 424. Examples of functions and services supported by the social network server 422 include the identification of other users of the messaging system 400 with which a particular user has relationships or is "following," and also the identification of other entities and interests of a particular user.

Returning to the messaging client 402, features and functions of an external resource (e.g., an application 404 or applet) are made available to a user via an interface of the messaging client 402. In this context, "external" refers to the fact that the application 404 or applet is external to the messaging client 402. The external resource is often provided by a third party but may also be provided by the creator or provider of the messaging client 402. The messaging client 402 receives a user selection of an option to launch or access features of such an external resource. The external resource may be the application 404 installed on the client device 302 (e.g., a "native app"), or a small-scale version of the application (e.g., an "applet") that is hosted on the client device 302 or remote of the client device 302 (e.g., on third-party servers 408). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 402. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 402 determines whether the selected external resource is a web-based external resource or a locally-installed application 404. In some cases, applications 404 that are locally installed on the client device 302 can be launched independently of and separately from the messaging client 402, such as by selecting an icon, corresponding to the application 404, on a home screen of the client device 302. Small-scale versions of such applications can be launched or accessed via the messaging client 402 and, in some examples, no or limited portions of the small-scale application can be accessed outside of the messaging client 402. The small-scale application can be launched by the messaging client 402 receiving, from a third-party server 408 for example, a markup-language document associated with the small-scale application and processing such a document.

In response to determining that the external resource is a locally-installed application 404, the messaging client 402 instructs the client device 302 to launch the external resource by executing locally-stored code corresponding to the external resource. In response to determining that the external resource is a web-based resource, the messaging client 402 communicates with the third-party servers 408 (for example) to obtain a markup-language document corresponding to the selected external resource. The messaging client 402 then processes the obtained markup-language document to present the web-based external resource within a user interface of the messaging client 402.

The messaging client 402 can notify a user of the client device 302, or other users related to such a user (e.g., "friends"), of activity taking place in one or more external resources. For example, the messaging client 402 can provide participants in a conversation (e.g., a chat session) in the messaging client 402 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 402, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 402. The external resource can selectively include different media items in the responses, based on a current context of the external resource.

The messaging client 402 can present a list of the available external resources (e.g., applications 404 or applets) to a user to launch or access a given external resource. This list can be presented in a context-sensitive menu. For example, the icons representing different ones of the application 404 (or applets) can vary based on how the menu is launched by the user (e.g., from a conversation interface or from a non-conversation interface).

Figure 5:
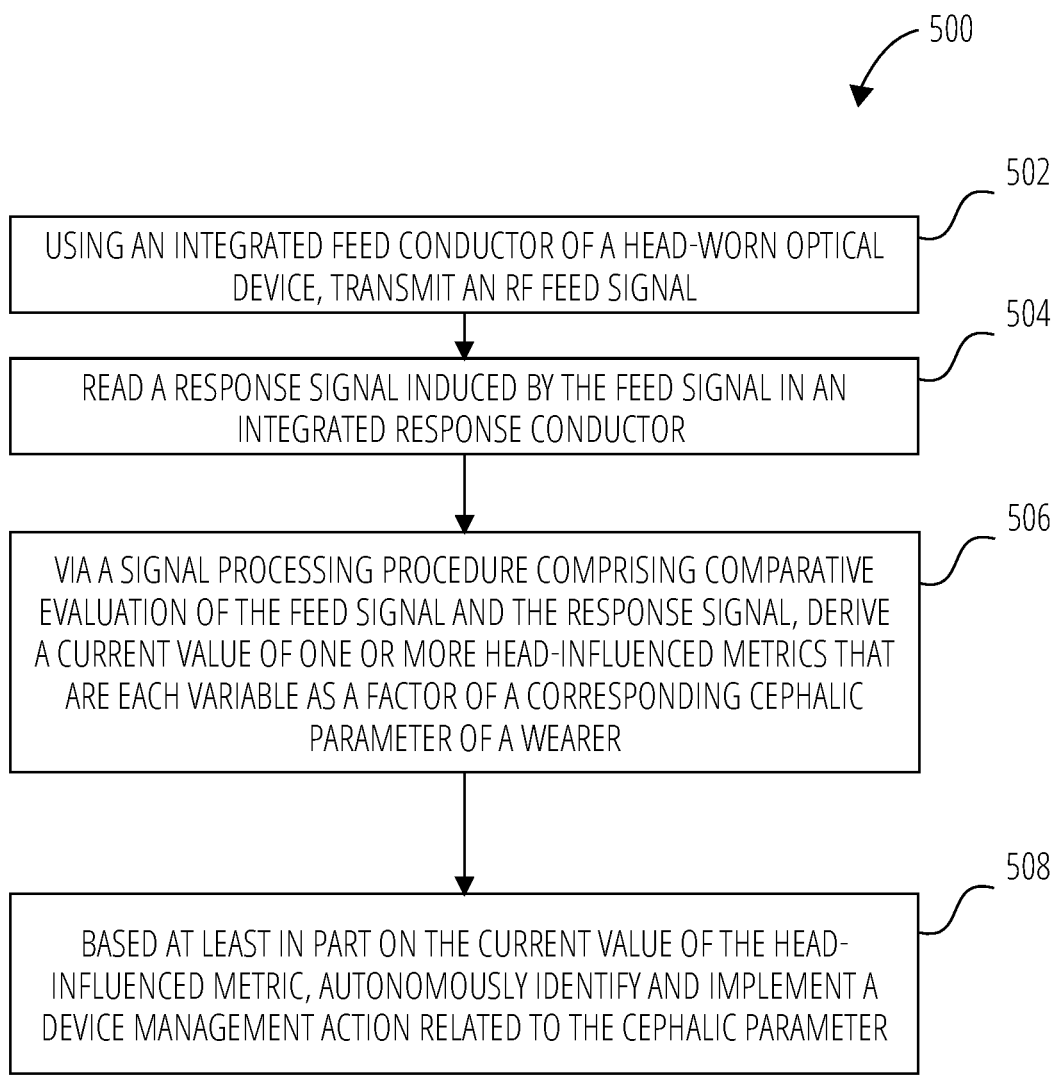
FIG. 5 illustrates a method 500 in accordance with one embodiment.

FIG. 5 is a high-level flow diagram of a method 500 for autonomous management of a head-wearable optical device such as a display-enabled eyewear device. The method will further be described with reference to the example AR glasses 100 of FIG. 1-FIG. 4, but it will be appreciated that the techniques described can in other instances be implemented with different example devices.

In operation 502, method 500 provides for, using a feed conductor incorporated in a head-worn device, transmits an RF feed signal. In operation 504, method 500 reads a response signal induced by the feed signal in a response conductor that is incorporated in the device In operation 506, method 500 in an automated operation performed by onboard electronics comprising one or more computer processor devices processors housed by the device, performs a signal processing procedure to derive, based at least in part on comparison between the feed signal and the response signal, a current value of a head-influenced metric that is variable as a factor of a cephalic parameter pertaining to a wearer's head, on which the device is currently worn. In operation 508, method 500 in an autonomous operation performed by the onboard electronics based at least in part on the current value of the head-influenced metric, identifies and implements a device management action related to the cephalic parameter.

Figure 6:
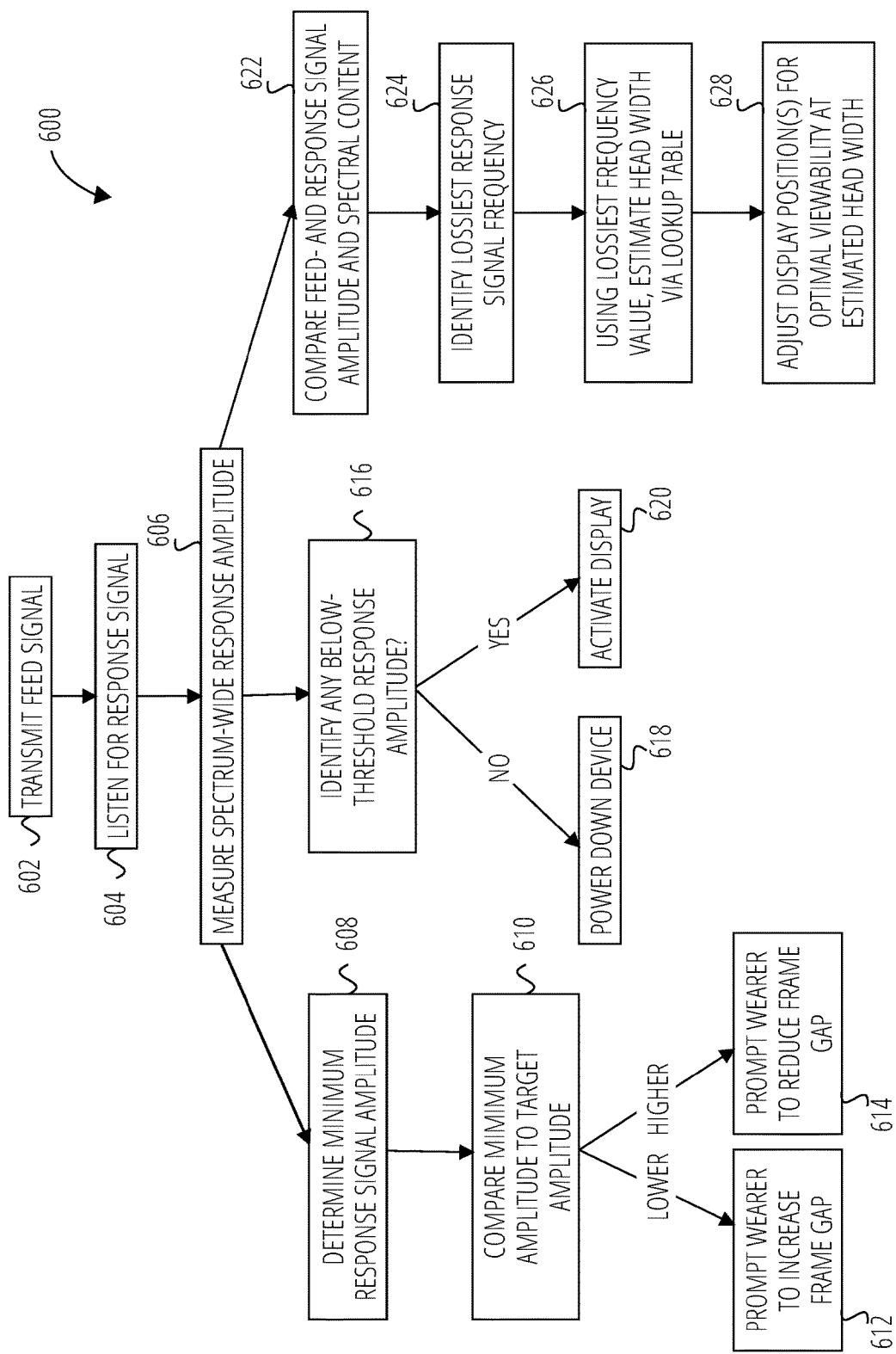
FIG. 6 is a lower-level flowchart illustrating a method for detecting one or more attributes of the head of a wearer of AR glasses consistent with the example of FIG. 1, and for responsive autonomous device management, according to one example.

FIG. 6 is a flowchart schematically illustrating a more detailed method 600 of integrated dynamic detection of currently applicable cephalic parameters of a wearer 702 (see FIG. 7) of a head-worn optical device. For ease of reference, the example method 600 will further be described as being performed by AR glasses 100 consistent with the examples illustrated by FIG. 1-FIG. 4, but it will be appreciated that differently configured eyewear devices can be used in the performance of analogous methods, in other examples. Moreover, operations of method 600 are in this example performed by onboard electronics 106 of the AR glasses 100, and in particular by a head sensor 102, including signal processor 206, and by a device management controller 224 but can in other embodiments be performed at least in part by a coupled client device 302 (FIG. 3) and/or server system 328.

At operation 602, transmitter 220 automatically drives transmission of an RF feed signal by the feed loop 126 of the head sensor 102. In some embodiments, such feed signals are continuously produced at set intervals, thereby to provide dynamic head parameter sensing on an on-going basis. In other instances, feed signal transmission is triggered by pre-defined events, e.g., powering up of the AR glasses 100 of the near-eye display 212.

In this example, feed pulse transmission comprises sending a pulse with spectral range appropriate for head detection, the spectral range of the pulse in this example spanning a pre-set target frequency band which encompasses those RF frequencies characteristically associated with RF absorption by the human head. Example target band values are evident from FIG. 7 and FIG. 8. The feed pulse in this example has a substantially consistent amplitude at each of the frequencies within the signal's spectral range.

As described previously, transmission of the feed signal creates H-fields extending axially through the feed loop 126, thus being normal the metal eyewear frame 110. During wear of the AR glasses 100, the frame 110 (and therefore the practically co-planar lenses 112 and coupler loops 126, 128) define an upright plane transversely spaced from a proximal frontal surface of the wearer's head 704 (i.e., from the wearer's face 706), which spacing is referred to as a frame gap 708. Accordingly, the feed signal's H-fields extend through the feed loop 126 broadly parallel to a viewing direction for the wearer through the lenses 112.

At operation 604, the receiver 214 listens for a response signal responsive to the feed signal whose strength curve in the frequency domain is indicative of proximate ambient RF absorptivity. In this example, listening for the response signal comprises continuous monitoring of the response loop 128 by the receiver 214.

Figure 8:
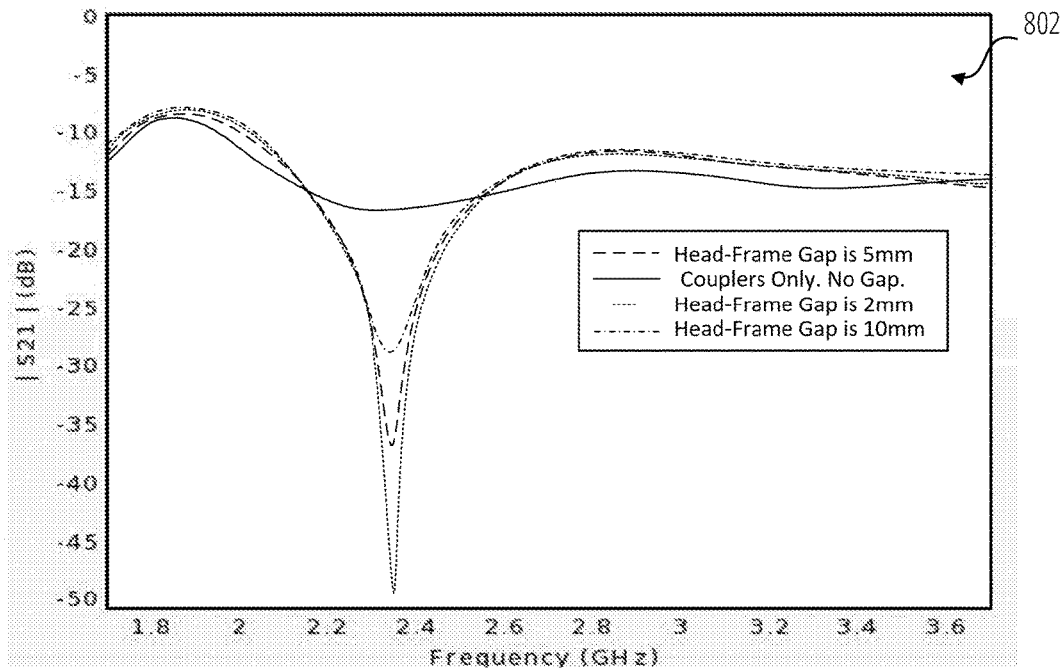
FIG. 8 is a graph showing frequency distribution of a scattering parameter for forward transmission by a head sensor loop coupler system incorporated in AR glasses consistent with that of FIG. 1-FIG. 7, the graph depicting a number of different curves for different respective simulations in which the sole variable between the simulations is the size of a frame gap by which a lens-carrying frame of the AR glasses is spaced from its wearer's face, according to one example.
Figure 9:
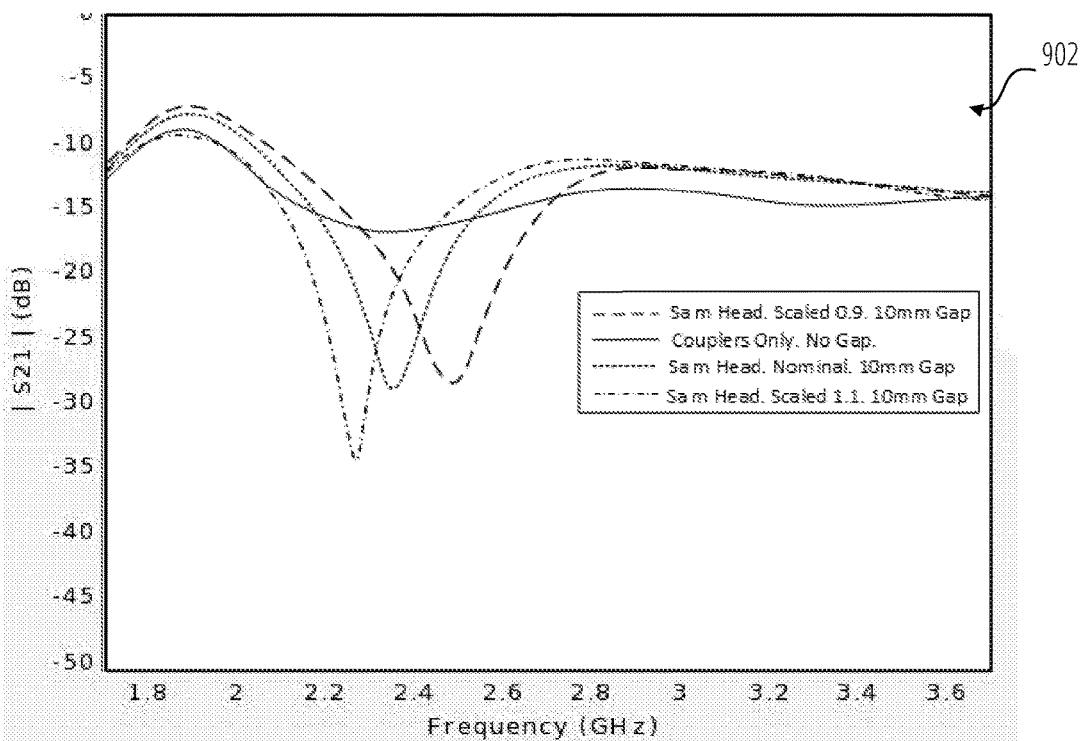
FIG. 9 is a graph similar to that of FIG. 8, the graph depicting a number of different curves for different respective simulations in which the sole variable between the simulations is a head size of the wearer of the AR glasses, according to one example.

At operation 606, the receiver 214 reads and records the response signal captured by the response loop 128, in this example comprising measuring response amplitude and spectral content. Resultant response signal data received by the 214 thus in some embodiments comprises a curve of response signal amplitude against frequency across the target spectral range, each measured data point comprising paired frequency and response amplitude values. Non-trivial variations in response amplitude result from and are thus indicative of ambient RF absorption, likely by external objects in the vicinity of the coupler loops 126, 128. FIG. 8 and FIG. 9 show example response signal parameter curves according to different examples.

The human head has empirically and/or computationally determined absorptive characteristics at RF frequencies, due to the tissue composition of the brain. If the AR glasses 100 are head-worn at the time of measurement, the feed-side H-fields 712 by the feed loop 126 will be partially absorbed by brain tissue in the wearers head 704. This will reduce the amount of energy available for capture by the response loops 128.

The closer the head 704 is to the response loop 128 (i.e., the smaller the frame gap 708), the more energy absorption will take place and the less energy there will be for the response loop 128. However, as the head 704 moves further away from the feed loop 126, there will be more energy for the response loop 128. Thus, the frame gap value is identified as a cephalic attribute which is a factor in response amplitude variation at a particular corresponding frequency. Differently worded: a current frame gap value is in some examples inferred or estimated based on measure response amplitude at the particular RF frequency maximally absorbed by the head 704.

In this example, frequency-spaced signal coupling strength is represented by a metric known as S21, being a scattering parameter for forward transmission. This respective example response signal curves of FIG. 8 and FIG. 9 represent distribution of the S21 parameter across the target spectral range. A size dimension of the head 704 (e.g., a head or face width value) and the design of the loop coupler system play a critical role in determining the particular frequency where this phenomenon is most amplified.

Inventors simulated an example of this phenomenon with a SAM phantom head 704 and a representative AR metal frame 110. Graph 802 of FIG. 8 shows results of a number of simulated cases varying only in size of frame gap 708. It will be observed that when there is no head presence, the signal coupling is relatively strong, averaging around −15 dB. When the head phantom is brought in, the coupling drops to −30 dB at 2.35 GHz. As the phantom head moves closer to the AR frames 110, the coupling progressively deteriorates, bottoming around −50 dB. 2.35 GHz is where this effect is the most obvious for the examples here represented. This frequency can be tuned by changing the size of the coupler loops 126, 128 or their feed locations.

Another cephalic parameter of which response signal is a factor is a size dimension of the head 704. More particularly, inventors identified specifically a size value of the face 706 (this example a facial width), influences that frequency in which brain tissue absorbs the most energy from the loop coupler system, also referred to herein as a lossiest frequency. A larger head 704 contributes a large increase in the effective dielectric constant the coupler loop 126, 128 are exposed to, resulting in maximum absorption (i.e., minimum response amplitude) to occur at a lower frequency. Worded differently, the lossiest frequency decreases with an increase in facial or cranial width.

Similarly, a smaller head 704 contributes a small increase in the effective dielectric constant the couplers are exposed to, resulting a higher lossiest frequency, where maximum absorption occurs at a higher frequency. Again, a figure of merit for this coupling was found to be the S21 scattering parameter for forward transmission. An example of this phenomenon is represented graph 902 of FIG. 9, which corresponds to graph 802 with the difference that the cephalic parameter varied in value between different simulations is facial width 710 (not frame gap 708 as in graph 802).

Observe from graph 902 that when there is no head presence, the coupling is relatively strong, averaging around −15 dB. When a nominal head phantom is brought in, the coupling drops to −30 dB at 2.35 GHz. If the phantom head 704 is scaled by 0.9×, the lossiest frequency moves up to 2.45 GHz. Similarly, if the phantom head is scaled up by 1.1×, the lossiest frequency moves down to 2.25 GHz. These frequency values can be changed by changing the coupler design, however, the fundamental effect of the head 704 will remain the same.

A smaller head 704 will have a higher maxima absorption frequency (i.e., the lossiest frequency), and a larger head will have a lower lossiest frequency. Differently worded: a value of the facial width 710 or head size of a human head 704 on which the device is mounted at measuring time is in some examples inferred or derived based the lossiest frequency value for feed-response coupling.

Returning now to FIG. 6, the example method further comprises, at operation 616, determining whether or not response signal amplitude at any frequency in the target spectral range is lower than a preset threshold value. Viewed differently, operation 616 determines whether the measured response curve looks like that curve in graph 902 with legend "Couplers Only, No Head."

If any below-threshold response amplitude is identified within the target frequency band, then the head sensor system is interpreted as having detected presence of a head on which the AR glasses 100 are mounted. Responsive to such detection of head presence indicating an active wear status, the device management controller 224 in this example autonomously triggers a response device management action or adjustment action comprising, at operation 620, activating the near-eye display 212.

If, on the other hand, it is determined at operation 616 that the response signal amplitude is above-threshold in value throughout the target frequency band, the head sensor system identifies a current wear status as non-worn, responsive to which at least some powered components of the AR glasses 100 are autonomously powered down, at operation 618.

At operation 608, the 214 determines a value for a minimum amplitude of the response signal in band. It will be understood with reference to graph 802 and graph 902 that such a minimum response amplitude is provided by the measure response signal amplitude at the lossiest in-band frequency for the response signal.

At operation 610, the identified minimum response signal amplitude vale is compared to a preset target amplitude comprising an amplitude value or in this instance to an amplitude range in this example bordered by upper and lower threshold values. The target amplitude is pre-determined to be correlated with a target frame gap identified as facilitating optimal optical quality of the near-eye display, e.g., being a frame gap value in which the near-eye display 212 is most reliably in focus for the wearer 702.

If operation 610 identifies that the minimum response amplitude exceeds an upper threshold of the target minimum amplitude, the device management controller 224 at operation 614 provides to the wearer 702 an adjustment prompt to reduce the frame gap 708, i.e., to shift the eyewear frame 110 closer to their face 706.

If, however, operation 610 identifies that the minimum response amplitude falls below a lower threshold of the target minimum amplitude, then the device management controller 224 at operation 612 prompts the wearer 702 to increase the frame gap, i.e., to move the frame 110 away from their face 706. In some examples, the adjustment prompts may indicate a suggested distance for the prompted adjustment in frame gap 708.

The method in some iterations further includes, at operation 622, comparing the spectral content of received response signal to feed signal, thereby for example calculating a response curve similar or analogous to those of FIG. 8 and FIG. 9, the response curve plotting response signal amplitude against frequency across the target spectral range.

At operation, 624, the 214 analyses the response curve frequency distribution to identify the lossiest frequency, being that frequency where the received spectral content is weakest.

At operation 626, the signal processor estimates a head with value as a function of the applicable lossiest frequency and a pre-established lookup table providing empirical or simulation-derived lookup data for frequency response to head size (in this instance, head width) conversion. As explained previously, lower lossiest frequencies correlate with larger head size values, and vice versa.

At operation 614, the device management controller 224 autonomously adjusts lateral display position(s) of the respective near-eye display areas 210 to optimize viewability thereof for the estimated head width, which is correlated with lateral distance between a user's eyes. In this example, a lateral spacing between left- and right active display areas within the underlying display areas 210 is automatically reduced for lower head width sizes and are shifted laterally apart for greater head width values. Thus, in the example embodiment described with reference to FIG. 2, display pixels that are best optimized for a given head size are activated, at operation 628. For example, a smaller detected head size in this example triggers activation inner pixels 218, which larger head sizes trigger activation of outer pixels 216.

Benefits of the head attribute sensing and autonomous responsive device adjustment include seamless, automatic detection of wear status, enabling power saving by auto-off functionality when not being worn. Autonomous adjustment of display location customized to the wearer's facial parameters promote eye safety by avoiding eye strain caused by viewing sub-optimally located display pixels, and/or by out-of-focus display resulting from sub-optimal frame gap values.

Machine Architecture

Figure 10:
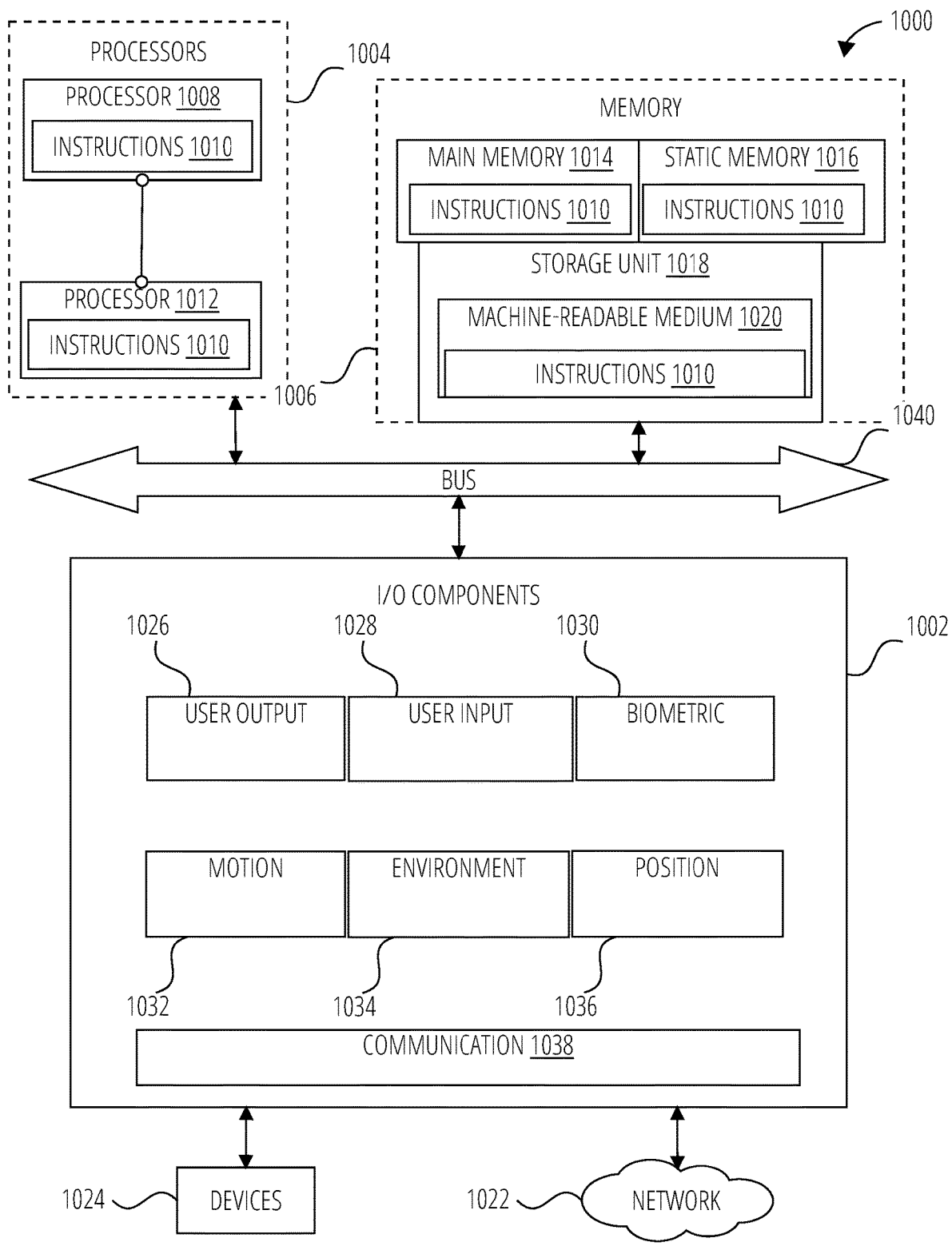
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1010 (e.g., software, a program, an application, an applet, an app, or other executable code) for causing the machine 1000 to perform any one or more of the methodologies discussed herein may be executed. For example, the instructions 1010 may cause the machine 1000 to execute any one or more of the methods described herein. The instructions 1010 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1010, sequentially or otherwise, that specify actions to be taken by the machine 1000. Further, while only a single machine 1000 is illustrated, the term "machine" shall also be taken to include a collection of machines that individually or jointly execute the instructions 1010 to perform any one or more of the methodologies discussed herein. The machine 1000, for example, may comprise the client device 302 or any one of a number of server devices forming part of the messaging server system 406. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1002, which may be configured to communicate with each other via a bus 1040. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1008 and a processor 1012 that execute the instructions 1010. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1014, a static memory 1016, and a storage unit 1018, both accessible to the processors 1004 via the bus 1040. The main memory 1006, the static memory 1016, and storage unit 1018 store the instructions 1010 embodying any one or more of the methodologies or functions described herein. The instructions 1010 may also reside, completely or partially, within the main memory 1014, within the static memory 1016, within machine-readable medium 1020 within the storage unit 1018, within at least one of the processors 1004 (e.g., within the Processor's cache memory), or any suitable combination thereof, during execution thereof by the machine 1000.

The I/O components 1002 may include a wide variety of components to receive input, provide output, produce output, transmit information, exchange information, capture measurements, and so on. The specific I/O components 1002 that are included in a particular machine will depend on the type of machine. For example, portable machines such as mobile phones may include a touch input device or other such input mechanisms, while a headless server machine will likely not include such a touch input device. It will be appreciated that the I/O components 1002 may include many other components that are not shown in FIG. 10. In various examples, the I/O components 1002 may include user output components 1026 and user input components 1028. The user output components 1026 may include visual components (e.g., a near-eye display such as a plasma near-eye display panel (PDP), a light-emitting diode (LED) near-eye display, a liquid crystal near-eye display (LCD), a projector, or a cathode ray tube (CRT)), acoustic components (e.g., speakers), haptic components (e.g., a vibratory motor, resistance mechanisms), other signal generators, and so forth. The user input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1002 may include biometric components 1030, motion components 1032, environmental components 1034, or position components 1036, among a wide array of other components. For example, the biometric components 1030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1032 include acceleration sensor components (e.g., accelerometer), gravitation sensor components, rotation sensor components (e.g., gyroscope).

The environmental components 1034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 302 may have a camera system comprising, for example, front cameras on a front surface of the client device 302 and rear cameras on a rear surface of the client device 302. The front cameras may, for example, be used to capture still images and video of a user of the client device 302 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 302 may also include a 360° camera for capturing 360° photographs and videos.

Further, the camera system of a client device 302 may include dual rear cameras (e.g., a primary camera as well as a depth-sensing camera), or even triple, quad or penta rear camera configurations on the front and rear sides of the client device 302. These multiple cameras systems may include a wide camera, an ultra-wide camera, a telephoto camera, a macro camera and a depth sensor, for example.

The position components 1036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1002 further include communication components 1038 operable to couple the machine 1000 to a network 1022 or devices 1024 via respective coupling or connections. For example, the communication components 1038 may include a network interface Component or another suitable device to interface with the network 1022. In further examples, the communication components 1038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1024 may be another machine or any of a wide variety of peripheral devices (e.g., a peripheral device coupled via a USB).

Moreover, the communication components 1038 may detect identifiers or include components operable to detect identifiers. For example, the communication components 1038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1038, such as location via Internet Protocol (IP) geolocation, location via Wi-Fi® signal triangulation, location via detecting an NFC beacon signal that may indicate a particular location, and so forth.

The various memories (e.g., main memory 1014, static memory 1016, and memory of the processors 1004) and storage unit 1018 may store one or more sets of instructions and data structures (e.g., software) embodying or used by any one or more of the methodologies or functions described herein. These instructions (e.g., the instructions 1010), when executed by processors 1004, cause various operations to implement the disclosed examples.

The instructions 1010 may be transmitted or received over the network 1022, using a transmission medium, via a network interface device (e.g., a network interface component included in the communication components 1038) and using any one of several well-known transfer protocols (e.g., hypertext transfer protocol (HTTP)). Similarly, the instructions 1010 may be transmitted or received using a transmission medium via a coupling (e.g., a peer-to-peer coupling) to the devices 1024.

Software Architecture

Figure 11:
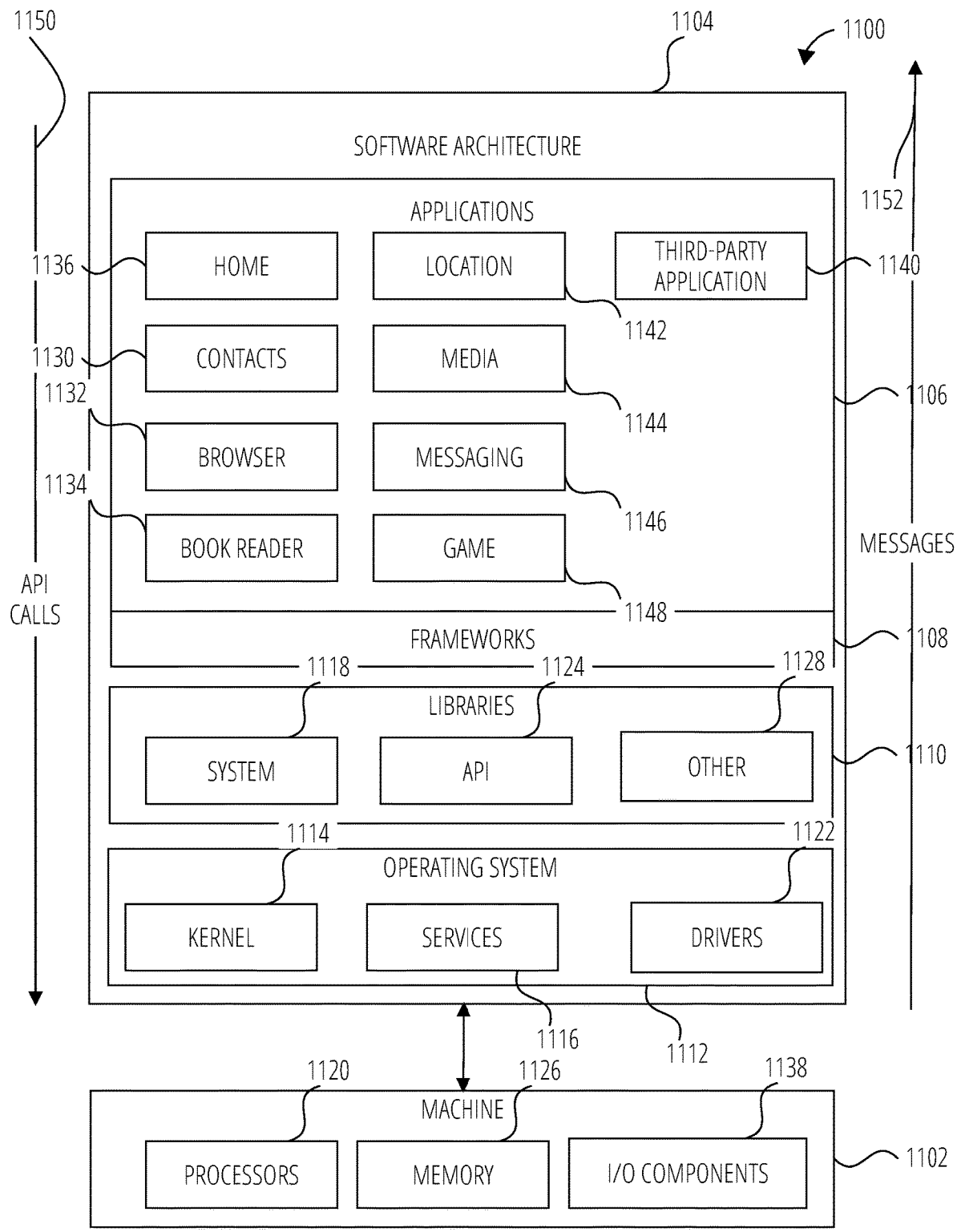
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include near-eye display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a near-eye display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A device comprising:
a device body configured to be supported, in use, on the head of a wearer of the device;
a head sensor comprising:
a feed conductor housed by the device body;
a response conductor housed by the device body at a location spaced from the feed conductor; and
a transceiver arrangement coupled to the feed conductor and to the response conductor, the transceiver being configured to perform operations comprising:
transmitting a radio frequency (RF) feed signal via the feed conductor; and
reading a response signal induced in the response conductor by the feed signal; and
one or more computer processor devices that forms part of onboard electronics and that is configured to perform operation comprising:
performing a signal processing procedure to derive, based at least in part on comparison between the feed signal and the response signal, a current value of a head-influenced metric that is variable, in use, as a factor of a cephalic parameter of a wearer on whose head the device is worn; and
identifying and implementing a device management action related to the cephalic parameter.

2. The device of claim 1, wherein the device is an eyewear device further comprising:
a loop coupler system that provides the feed conductor and the response conductor in the form of paired coupler loops, the loop coupler system comprising:
a feed loop driven by the transceiver arrangement to transmit the feed signal; and
a response loop coupled to transceiver arrangement to receive the response signal, the response loop being inductively coupled with the feed loop,
wherein the device body comprises a lens-carrying eyewear frame, the coupler loops being housed by the eyewear frame such that each of the coupler loops lies in a respective operatively upright plane oriented transversely to an operative viewing direction of the device.

3. The device of claim 2, wherein the eyewear frame holds a laterally spaced pair of lenses, and wherein each of the coupler loops extends peripherally about a respective one of the pair of lenses, each coupler loop being substantially co-planar with the respective lens.

4. The device of claim 3, wherein the onboard electronics is configured to perform the signal processing procedure based at least in part on analyzing a parameter indicative of comparative forward transmission efficiency across a spectral range that spans a target band of RF frequencies characteristically associated with absorption by human heads.

5. The device of claim 4, wherein the cephalic parameter comprises wear status, indicating whether or not the eyewear device is currently worn.

6. The device of claim 5, wherein the onboard electronics is configured to derive the wear status by operations comprising:
determining that the device is currently worn conditional upon identification of feed-response coupling at a frequency within the target band as falling below a pre-defined threshold; and
determining that the device is currently unworn if feed-response coupling is above-threshold in strength across the spectral range.

7. The device of claim 6, wherein the device management action comprises, responsive to determining, while an integrated near-eye display of the eyewear device is de-activated, that the device is currently worn, automatically activating the near-eye display.

8. The device of claim 4, wherein the cephalic parameter comprises a frame gap defined by a transverse spacing in a viewing direction between the eyewear frame and the head of the wearer.

9. The device of claim 8, wherein the onboard electronics is configured to derive the head-influenced metric indicative of a current frame gap value by a procedure comprising, at least in part, determining a response signal amplitude at a lossiest frequency within the target band, thus identifying a minimum amplitude for the response signal in the target band.

10. The device of claim 9, wherein the device management action comprises:
determining that the minimum amplitude transgresses a threshold of a predefined target frame gap that facilitates visual clarity, in wearer perspective, of a near-eye display incorporated in the eyewear device; and
automatically communicating to the wearer an adjustment prompt to change the transverse spacing between the eyewear frame and the head of the wearer.

11. The device of claim 4, wherein the cephalic parameter comprises head size, quantifying one or more dimensions of the head of the wearer.

12. The device of claim 11, wherein the onboard electronics is configured to derive the current value for the head-influenced metric in a procedure that comprises, at least in part:
identifying a lossiest frequency, being that frequency in the target band at which signal loss between the feed loop and the response loop is greatest; and
estimating a current head size value based on the lossiest frequency of the response signal.

13. The device of claim 12, wherein the estimating of the current head size value comprises a lookup operation using the lossiest frequency as reference value in interrogation of lookup data comprising multiple values for lossiest frequency correlated to different respective head size values.

14. The device of claim 13, wherein the device management action comprises:
based on the current head size value, identifying for activation a particular sub-portion of an available display area provided by an integrated near-eye display; and
autonomously activating the particular sub-portion of an available display area of the near-eye display, thereby adjusting display position of the near-eye display based on the estimated current head size value.

15. A method comprising:
using a feed conductor incorporated in a head-worn device, transmitting a radio frequency (RF) feed signal;
reading a response signal induced by the feed signal in a response conductor that is incorporated in the device;
in an automated operation performed by onboard electronics comprising one or more computer processor devices processors housed by the device, performing a signal processing procedure to derive, based at least in part on comparison between the feed signal and the response signal, a current value of a head-influenced metric that is variable as a factor of a cephalic parameter pertaining to a head of the wearer, on which the device is currently worn; and
in an autonomous operation performed by the onboard electronics based at least in part on the current value of the head-influenced metric, identifying and implementing a device management action related to the cephalic parameter.

16. The method of claim 15, wherein:
the device is an eyewear device comprising a lens-carrying eyewear frame;
wherein the device further comprises a loop coupler system having a pair of coupler loops comprising a feed loop which serves as the feed conductor and a response loop which serves as the response conductor, each coupler loop extending circumferentially about an associated lens held by the eyewear frame; and
wherein the signal processing procedure is based at least in part on analyzing variation in feed-response coupling across a spectral range that spans a target band of RF frequencies characteristically associated with absorption by the human head.

17. The method of claim 16, further comprising identifying a wear status of the eyewear device, indicating whether or not the eyewear device is currently worn, identification of the wear status comprising:
establishing whether or not feed-response coupling efficiency falls below a predefined threshold for any frequency within the target band;
responsive to and conditional upon establishing that the feed-response coupling includes a below-threshold value with the target band, determining that the eyewear device is currently worn; and
responsive to and conditional upon establishing that the feed-response coupling does not transgress the threshold within the target band, determining that the eyewear device is currently unworn.

18. The method of claim 17, wherein the device management action comprises, responsive to determining, while an integrated near-eye display of the eyewear device is deactivated, that the device is currently worn, automatically activating the near-eye display.

19. The method of claim 16, wherein the signal processing procedure comprises:
determining a response signal amplitude at a lossiest frequency within the target band, thus identifying a minimum amplitude for the response signal in the target band; and
based on the minimum amplitude of the response signal, estimating a current value for a frame gap defined by a transverse spacing in a viewing direction between the eyewear frame and the head of the wearer.

20. The method of claim 19, wherein the device management action comprises:
determining that the minimum amplitude transgresses a threshold of a predefined target frame gap that facilitates visual clarity, in wearer perspective, of a near-eye display incorporated in the eyewear device; and
automatically communicating to the wearer an adjustment prompt to change the transverse spacing between the eyewear frame and the head of the wearer.

21. The method of claim 16, wherein the device management action comprises:
identifying a lossiest frequency, being that frequency in the target band at which signal loss between the feed loop and the response loop is greatest; and
estimating a current value for head size based on the lossiest frequency of the response signal;
wherein the device management action comprises:
based on the current head size value, identifying for activation a particular sub-portion of an available display area provided by a near-eye display incorporated in the eye-wear device; and
autonomously activating the particular sub-portion of an available display area of the near-eye display, thereby adjusting display position of the near-eye display based on the estimated current head size value.

* * * * *